(12) United States Patent
Mar

(10) Patent No.: US 11,148,733 B2
(45) Date of Patent: Oct. 19, 2021

(54) APPARATUS FOR THE MODIFICATION OF VEHICLES

(71) Applicant: Dav Mar, Farmington, NM (US)

(72) Inventor: Dav Mar, Farmington, NM (US)

(73) Assignee: SYNOPTIC DESIGNS LLC, Farmington, NM (US)

( * ) Notice: Subject to any disclaimer, the term of this patent is extended or adjusted under 35 U.S.C. 154(b) by 0 days.

(21) Appl. No.: 16/750,549

(22) Filed: Jan. 23, 2020

(65) Prior Publication Data

US 2020/0156713 A1 May 21, 2020

Related U.S. Application Data

(63) Continuation of application No. 15/948,410, filed on Apr. 9, 2018, now Pat. No. 10,604,194.

(51) Int. Cl.
| | | |
|---|---|---|
| *B62D 33/08* | (2006.01) | |
| *B60J 7/12* | (2006.01) | |
| *B62D 33/02* | (2006.01) | |
| *B62D 25/08* | (2006.01) | |
| *B60J 7/10* | (2006.01) | |
| *B60R 9/08* | (2006.01) | |
| *B62D 43/02* | (2006.01) | |
| *B62D 33/04* | (2006.01) | |

(52) U.S. Cl.
CPC .............. *B62D 33/08* (2013.01); *B60J 7/106* (2013.01); *B60J 7/12* (2013.01); *B62D 25/08* (2013.01); *B62D 33/02* (2013.01); *B60R 9/08* (2013.01); *B62D 33/04* (2013.01); *B62D 43/02* (2013.01)

(58) Field of Classification Search
CPC ...... B62D 33/08; B62D 33/03; B62D 33/023; B62D 33/02; B60R 9/08; B60R 9/06

USPC ......... 296/26.08, 26.11, 26.04, 26.06, 26.02; 224/402, 404, 282, 488, 512, 513.502, 224/508, 495

See application file for complete search history.

(56) References Cited

U.S. PATENT DOCUMENTS

| | | | |
|---|---|---|---|
| 4,161,336 | A | 7/1979 | LeVan et al. |
| 4,842,326 | A | 6/1989 | DiVito |
| 5,286,081 | A | 2/1994 | Martin, Jr. |
| 6,033,012 | A | 3/2000 | Russke et al. |
| 6,149,228 | A | 11/2000 | O'Neill et al. |
| 6,247,743 | B1 | 6/2001 | Bonanno |
| 6,412,847 | B2 | 7/2002 | De Gaillard |

(Continued)

OTHER PUBLICATIONS

Recruit 2-Door JK Half Hardtop Kit, www.gr8tops.com, printed Apr. 9, 2018, 4 pages.
Safari Cab, Jeff Scherb, 2010, 1 page.

*Primary Examiner* — Dennis H Pedder
(74) *Attorney, Agent, or Firm* — Loza & Loza LLP; Kevin L. Soules

(57) ABSTRACT

A system, method, and apparatus for modifying a vehicle comprising a cab enclosure configured to interface with a vehicle, a fixed deck, configured rearward of, and cooperating with, the vehicle cab, and an extensible deck projecting from, and cooperating with, the fixed deck. The cab enclosure further comprises at least one roof adaptor comprising at least one roof adaptor panel connected to the vehicle and a lower cab enclosure comprising at least one panel connected to the vehicle wherein the cab enclosure elements, fixed deck, and extensible deck are connected to the vehicle without permanent modification to the vehicle.

15 Claims, 20 Drawing Sheets

(56) References Cited

U.S. PATENT DOCUMENTS

| | | | |
|---|---|---|---|
| 6,419,304 B1 | 7/2002 | Richardson, II et al. | |
| 6,474,713 B1 | 11/2002 | Ruck et al. | |
| 6,517,111 B2 | 2/2003 | Mizuta | |
| 6,692,055 B2 * | 2/2004 | Schilling | B60P 1/435 |
| | | | 296/26.11 |
| 7,021,694 B1 * | 4/2006 | Roberts | B60J 7/102 |
| | | | 135/88.13 |
| 7,048,082 B2 | 5/2006 | Mori et al. | |
| 7,140,670 B2 | 11/2006 | Olson | |
| 7,467,820 B2 | 12/2008 | Gotz | |
| 7,735,896 B2 | 6/2010 | Kubota | |
| 7,854,463 B1 | 12/2010 | Neumann | |
| 7,914,060 B2 | 3/2011 | Scribner et al. | |
| 8,136,857 B2 | 3/2012 | Shimizu et al. | |
| 8,215,690 B2 | 7/2012 | Nishiike et al. | |
| 8,267,454 B2 | 9/2012 | Takano et al. | |
| 8,733,826 B1 | 5/2014 | Montone et al. | |
| 8,882,170 B2 | 11/2014 | Brown, Jr. | |
| 8,998,303 B2 | 4/2015 | Gielda et al. | |
| 9,315,219 B2 | 4/2016 | Knoblett et al. | |
| 2002/0145299 A1 | 10/2002 | Henderson | |
| 2002/0180231 A1 | 12/2002 | Fox | |
| 2004/0256873 A1 | 12/2004 | McManus et al. | |
| 2005/0161964 A1 | 7/2005 | Adelman, Jr. | |
| 2006/0087150 A1 | 4/2006 | Curtis, Jr. et al. | |
| 2007/0164587 A1 | 7/2007 | Brockhoff | |
| 2008/0136206 A1 | 6/2008 | McKelvey | |
| 2008/0276443 A1 | 11/2008 | Hampel | |
| 2008/0277969 A1 * | 11/2008 | Sato | B62D 25/2054 |
| | | | 296/193.08 |
| 2009/0096237 A1 | 4/2009 | Gagliano | |
| 2009/0256392 A1 | 10/2009 | Buda et al. | |
| 2009/0273209 A1 | 11/2009 | Joab | |
| 2011/0109120 A1 | 5/2011 | Bonerb | |
| 2012/0237326 A1 | 9/2012 | Van Ness | |
| 2013/0241228 A1 * | 9/2013 | Nakamura | B62D 25/088 |
| | | | 296/26.08 |
| 2016/0031493 A1 | 2/2016 | Whiteford | |
| 2019/0092148 A1 | 3/2019 | Rodriguez | |

\* cited by examiner

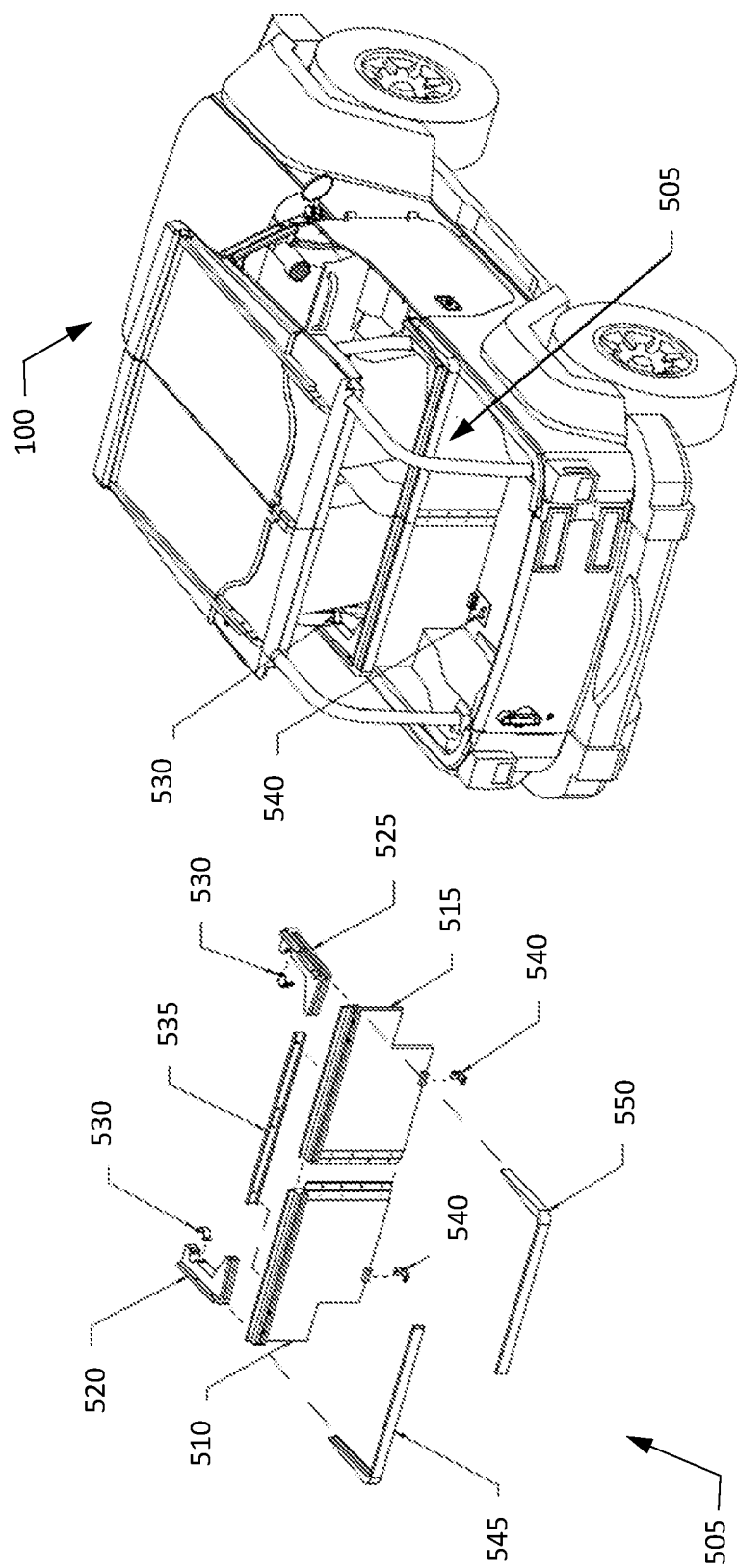

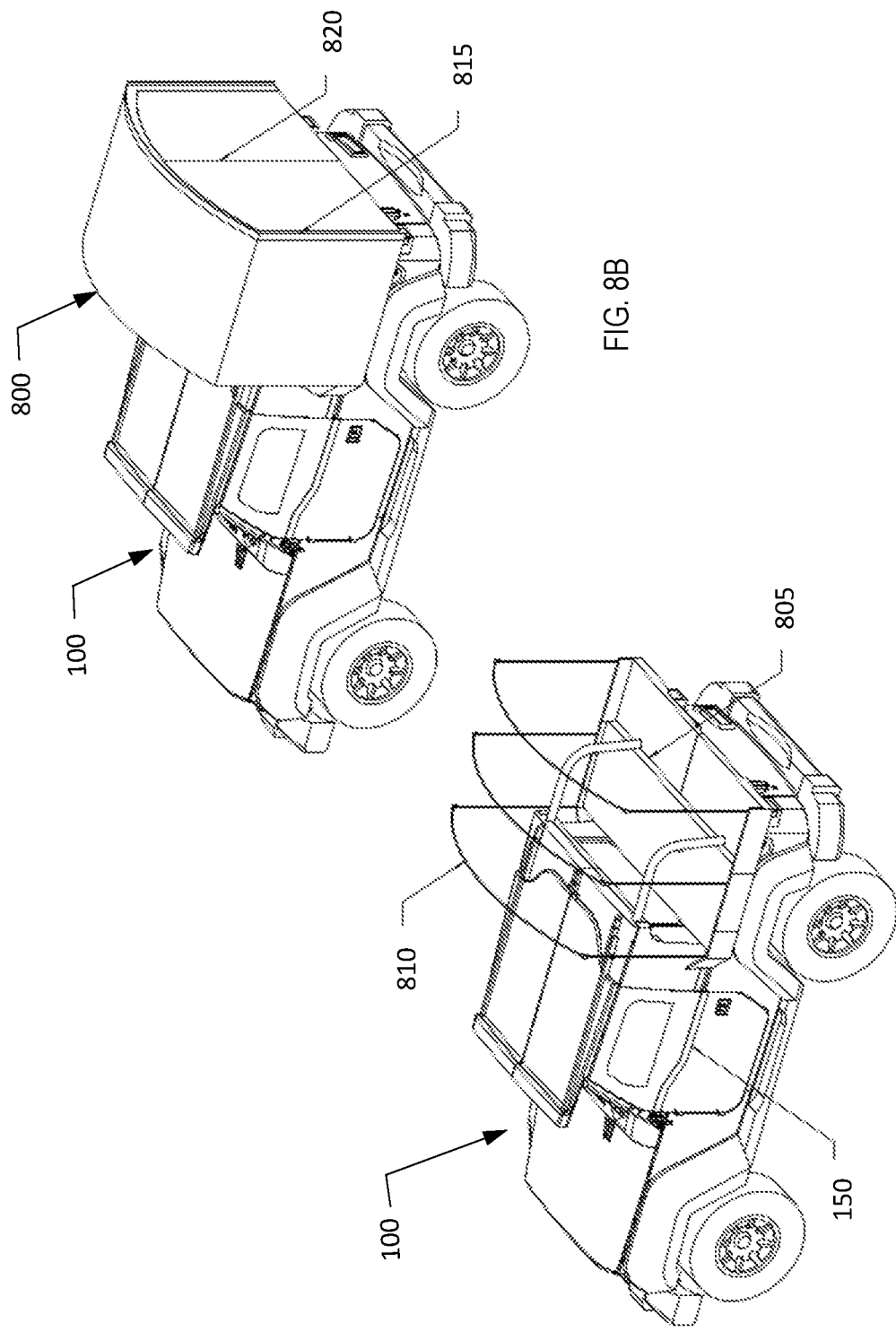

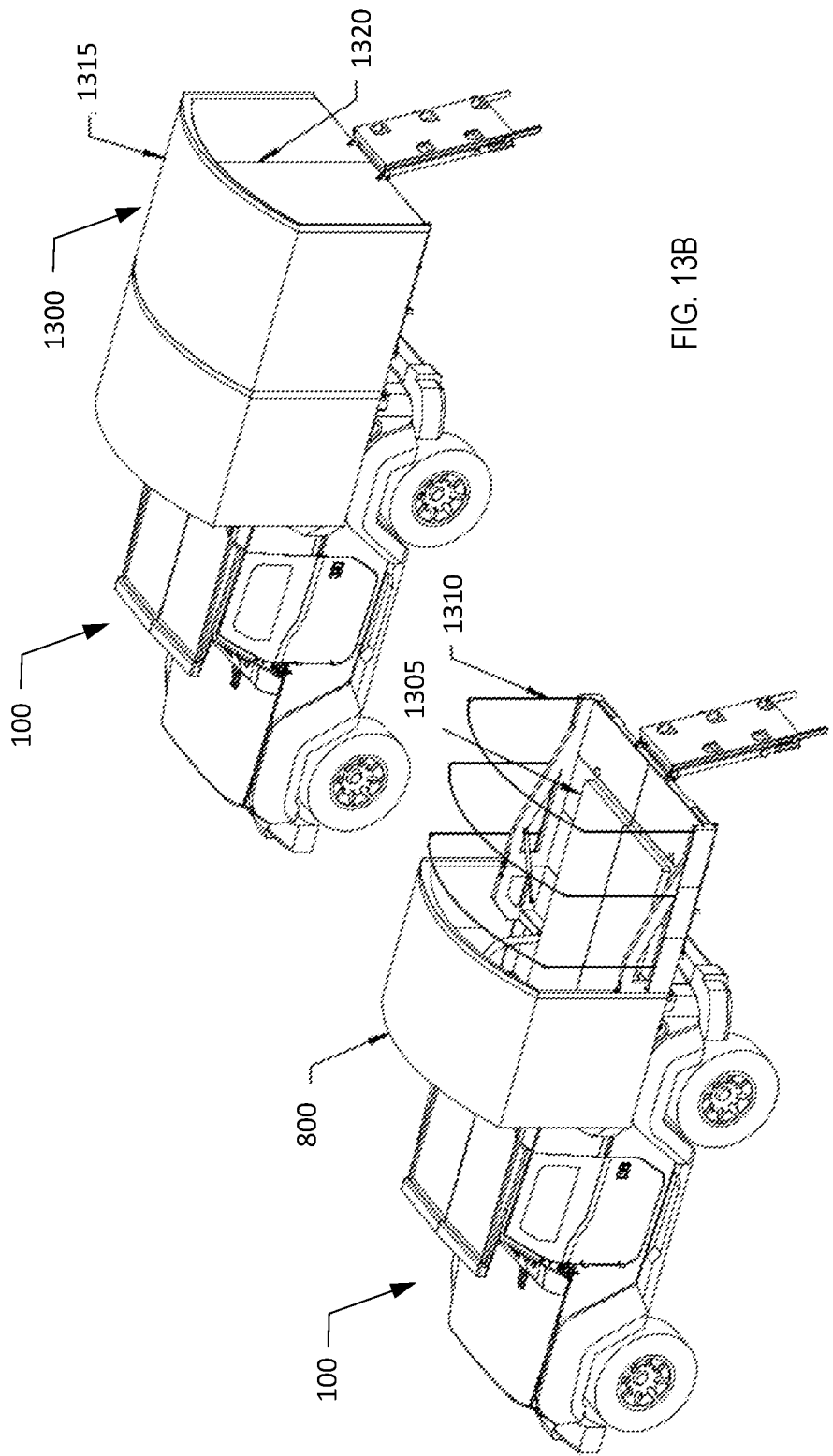

APPARATUS FOR THE MODIFICATION OF VEHICLES

This application is a Continuation of U.S. application Ser. No. 15/948,410 entitled "APPARATUS FOR THE MODIFICATION OF VEHICLES," filed on Apr. 9, 2018. Application Ser. No. 15/948,410 is incorporated herein by reference in its entirety.

TECHNICAL FIELD

Technical Field

Embodiments are generally related to the field of vehicles and vehicle modifications. Embodiments are further related to an adaptable multi-configurable cooperating apparatus and elements for the non-permanent reversible modification of certain vehicle classes, including, but not limited to, sport recreational vehicles of on or off-road configurations. Embodiments are also related to systems for enclosing a vehicle cab, covering a vehicle cargo area, and extending a structural deck from a vehicle.

Background

A number of vehicles offer configurations with convertible or other such open top arrangements. A variety of "original equipment manufacturer" (OEM) and other aftermarket vehicle tops are available including, for example, convertible fabric tops and rigid or semi-rigid top elements.

In most cases, these aftermarket products are constructed of relatively large individual components, which increases supply chain costs and installation difficulty. Furthermore, permanent modification of the target vehicle is usually required for installation. For example, in some cases the complete removal of OEM structural roll cage and/or the drilling of holes in the vehicle body and/or frame are required for installation.

Additionally, prior art enclosures typically leave a rear cargo area open and unsecured. Prior art, non-load bearing flexible, or semi-rigid covers, or other such lightweight covers that extend over the rear cargo area are available. However, such approaches are not secure against more than casual tampering or attempts to breach the enclosed cargo area.

Solutions for vehicle roof top mounting of cargo or human habitation are also commercially available. However, such solutions are generally incompatible with the stock configuration of the vehicle (i.e., they cannot be installed with the OEM rear bumper affixed or the like, and/or require permanent modification of the target vehicle). A significant disadvantage of these devices is the adverse effect that the addition of weight on the top of the vehicle has on the center of gravity, and hence, the stability of the vehicle. This problem is exacerbated by the fact that, as a class, many sport vehicles already have a high center of gravity as compared to ordinary passenger vehicles. Rooftop platforms used to accommodate cargo have the additional disadvantage that loading and unloading cargo or access for human habitation at substantial height above ground level is inconvenient.

Accordingly, there is a need in the art for systems that provide modifications of certain vehicles with improvements to the security, safety, and utility of the vehicle as described in the embodiments disclosed herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method, system, and apparatus for vehicle modification.

It is another aspect of the disclosed embodiments to provide a method, system, and apparatus for modifying certain vehicle classes with one or more of an adaptable passenger compartment enclosure, secure and substantially load bearing cargo space covering, and an extensible deck.

It is another aspect of the disclosed embodiments to provide a method, system, and apparatus for modifying a convertible sport utility vehicle, or other such vehicle, with an adaptable passenger compartment enclosure, secure and substantially load bearing cargo space covering, and an associated extensible deck.

In the embodiments disclosed herein a system, apparatus, and method comprising an adaptable multi-configurable cooperating apparatus and elements for the non-permanent reversible modification of certain vehicle classes, including, but not limited to, sports recreational vehicles of on or off-road configuration are disclosed.

The embodiments disclosed herein include one or more of three basic systems or modules. First, an adaptable passenger compartment enclosure can be installed without permanent modification of the vehicle. Second, a system or module that adaptably provides for the handling and transport of cargo and/or an on-vehicle tent/sleeping platform, or the like, by means of a substantially load-bearing deck, and storage compartments, removably affixed to the vehicle.

The second system or module can simultaneously provide an enclosed substantially securable cargo volume rearward of the passenger compartment. The cargo volume may be provided with storage compartments for the organization of cargo and which may cooperate with other modules, and may be installed without permanent modification of the vehicle.

A third system or module includes a movable deck, rearwardly extensible from the vehicle body, and the cooperating second system or module, and which is attached in a manner that allows for deployment of the extensible deck section in multiple positions, including, but not limited to, deployment in a position that locates the deck surfaces of the fixed and movable deck sections in a substantially mutually planar orientation, for employment as a tent/sleeping platform, the transport of cargo, or the like. The extensible deck can be rotated over the top of the vehicle in a manner more compact for transit than as extended to the rear of the vehicle or for the transport of cargo above the vehicle.

Finally, the embodiments can be implemented to include any individual system or module or any combination of the three systems or modules, which, in some embodiments, can cooperate with each other, and in other embodiments, can be implemented independently.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 5A depicts a lower rear bulkhead assembly in accordance with the disclosed embodiments;

FIG. 5B depicts a lower rear bulkhead assembly in accordance with the disclosed embodiments;

FIG. 8A depicts a fixed deck assembly and associated enclosure in accordance with the disclosed embodiments;

FIG. 8B depicts a fixed deck assembly and associated enclosure in accordance with the disclosed embodiments;

FIG. 13A depicts an extensible deck assembly in a fully deployed configuration with an associated enclosure in accordance with the disclosed embodiments;

FIG. 13B depicts an extensible deck assembly in a fully deployed configuration with an associated enclosure in accordance with the disclosed embodiments;

DETAILED DESCRIPTION

Figure 1:
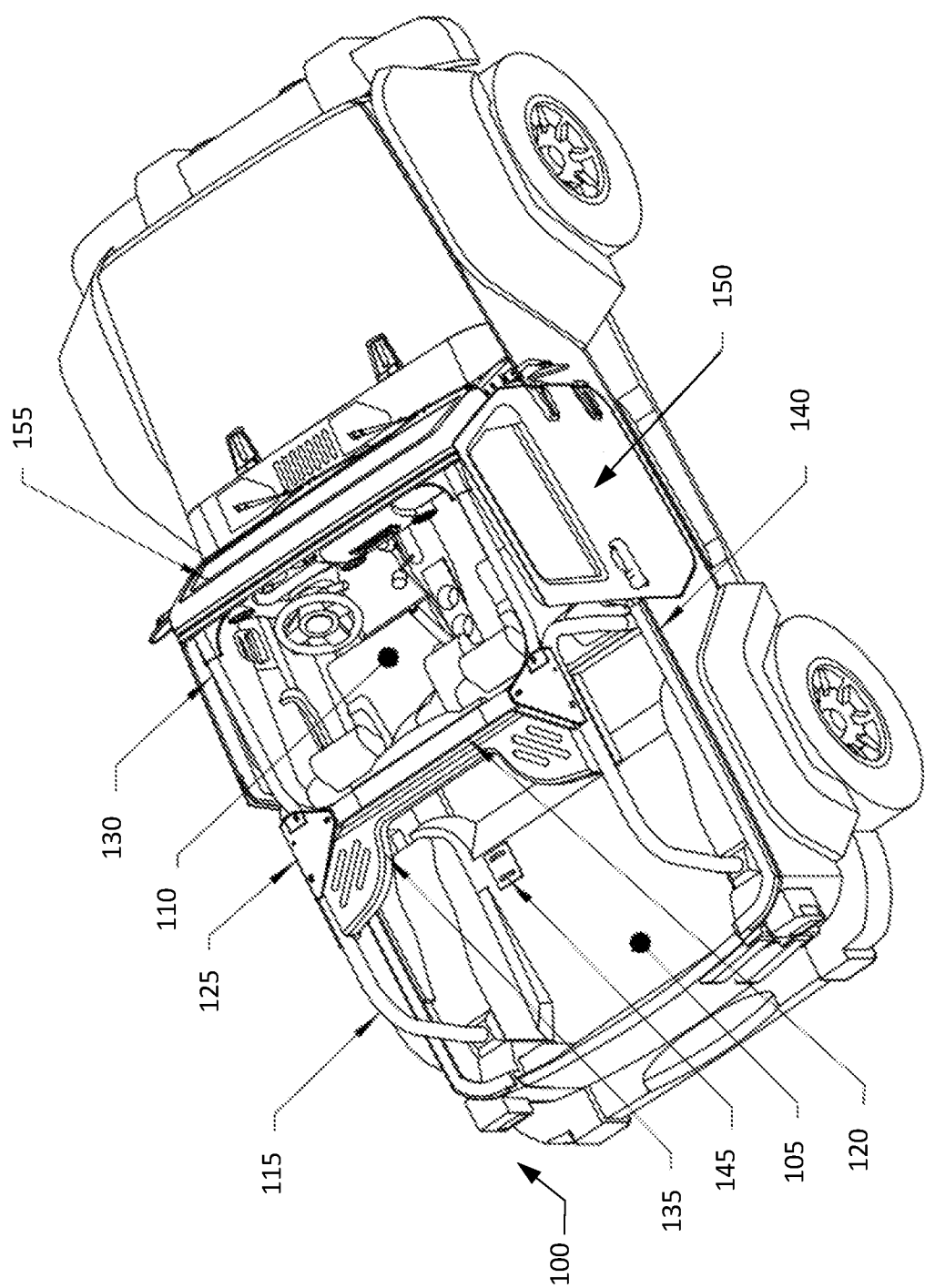
FIG. 1 depicts a vehicle in accordance with the disclosed embodiments.

The particular values and configurations discussed in the following non-limiting examples can be varied and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that multiple fastening and securement methods, as known to one skilled in the art, may be employed to attach elements of the invention to each other or to a vehicle. Methods for particular embodiments described herein are for the purposes of illustration and are not intended to exclude other, or additional, fastening and securement methods including, but not limited to, discrete threaded or quick-acting fasteners of any type, latches of any type, clamps of any type, straps of any type, cooperating snap-fit means, or any other commonly employed fastening or attachment methods. It should be understood that elements described as "connected," "attached," "cooperating," or otherwise engaged can be connected according to these means.

It is contemplated that any embodiment discussed in this specification can be implemented with respect to any method, kit, or composition of the invention, and vice versa.

Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements, or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those skilled in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The embodiments disclosed herein provide a multi-configurable and cooperating system of elements and sub-elements to improve the utility of certain motor vehicle classes. The embodiments can be employed in numerous avocational or vocational activities. In addition, a benefit of the systems, methods, and apparatus described herein includes the provision of the various features in a manner that reduces supply chain costs, including, but not limited to, manufacture, handling, shipping, and installation, without permanent modification of the target vehicle. The installation of the systems or modules is meant to be simple, requiring the use of only a few basic hand tools. The embodiments include three basic systems as further illustrated herein. The sub-features may provide benefit in furthering the utility of the basic systems by enhancing the suitability of any, or all, of the three basic systems for specific purposes.

FIG. 1 illustrates the OEM configuration of a typical target vehicle upon which various embodiments disclosed herein can be implemented. A target vehicle can include any type of vehicle upon which installation of an embodiment is possible, and the target vehicle illustrated in FIG. 1 is meant to be exemplary. In certain embodiments, the target vehicle can be a convertible sport utility vehicle, truck, or other such vehicle. The target vehicle includes a vehicle 100 with a rear cargo area 105 and cab area 110. A roll cage 115 can be included on the vehicle, including a roll cage cross member 120, and a roll cage gusset plate 125. Many vehicles 100 will include a removable windshield brace 130 and windshield frame 155. A rear audio speaker enclosure 135 is illustrated. The body rim 140 of vehicle 100 is also shown along with the OEM rear seat latch hard point 145. The OEM full hard door 150 is shown, but other door configurations, such as soft doors (as illustrated in other figures) are also frequently employed and are compatible with embodiments of the invention.

As used herein, the vehicle roll cage 115 can refer to the roll cage, generally including the tubing, crosspiece, gussets, and windshield braces, and not specifically to a tubular element only (although such elements can be included). Thus, roll cage 115 can specifically refer to the tubular elements of the roll cage.

Figure 3:
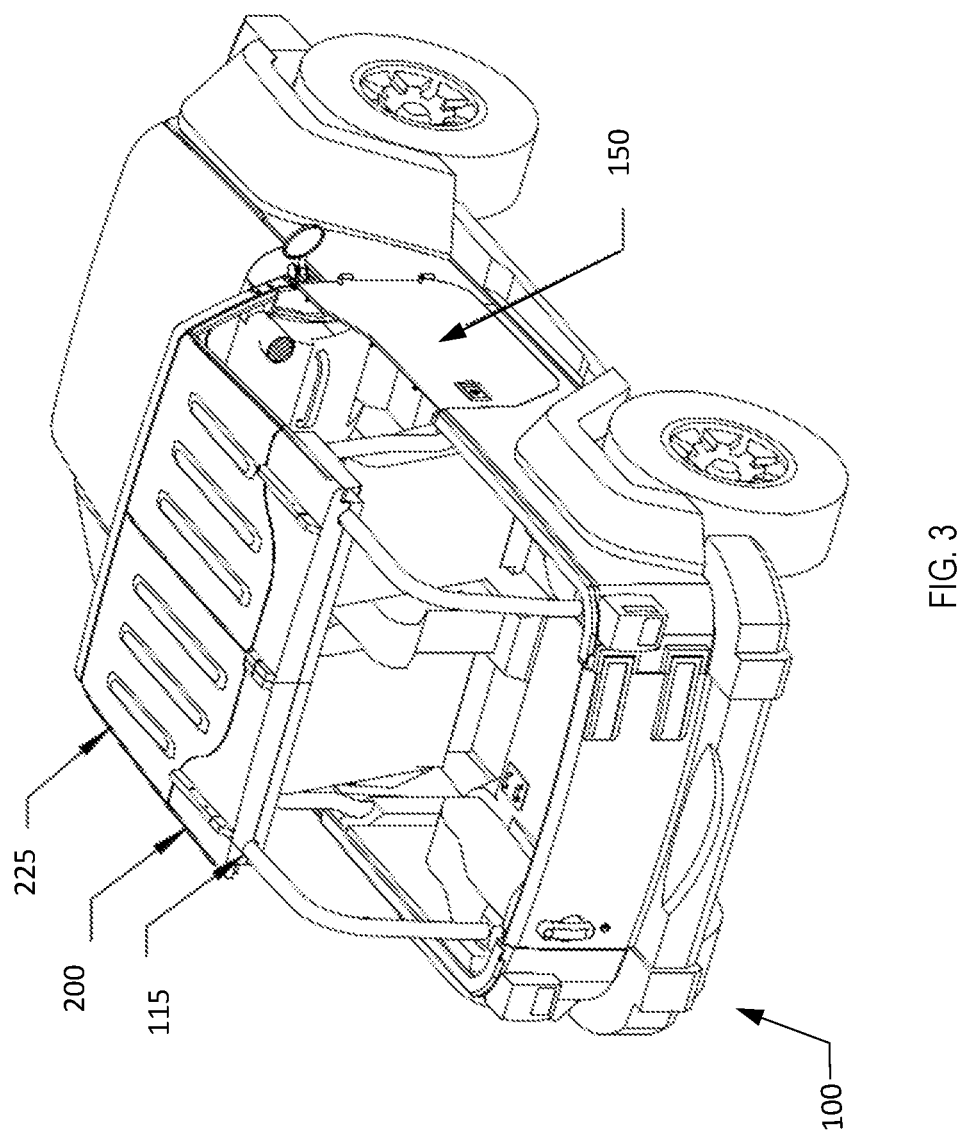
FIG. 3 depicts a roof adaptor connected to a vehicle in accordance with the disclosed embodiments.

The first basic features of the disclosed embodiments comprise a cab enclosure 200, as shown in FIG. 3. The cab enclosure 200 is an adaptable apparatus embodied as an enclosure for the front passenger compartment of a target vehicle 100.

Figure 2:
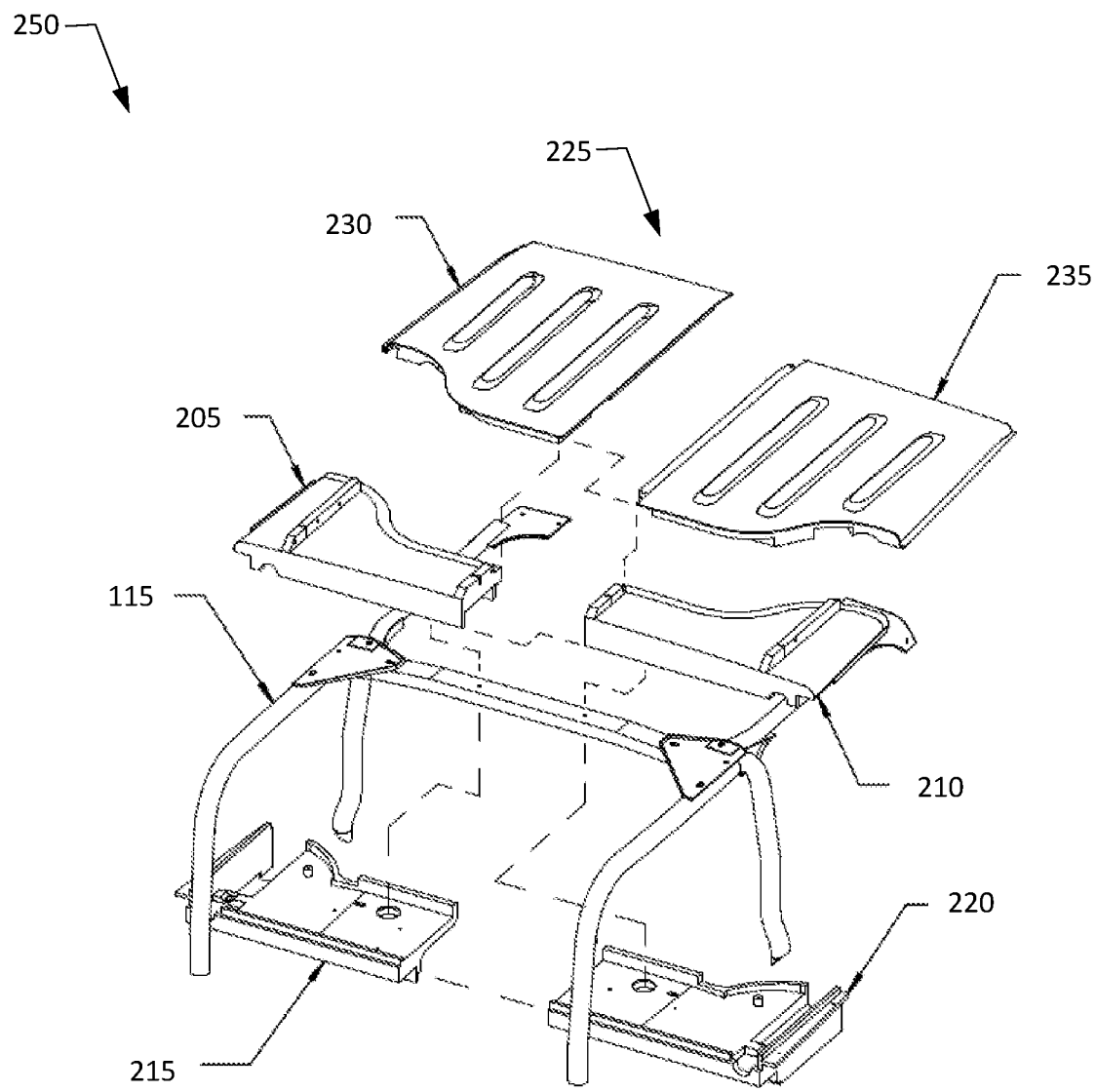
FIG. 2 depicts a roof adaptor in accordance with the disclosed embodiments.

Specifically, FIG. 2 illustrates elements of a cab enclosure roof adaptor assembly 250 and OEM rigid removable roof panel assembly 225 associated with a cab enclosure 200. In general, the cab enclosure roof adaptor assembly 250 can include a left upper roof adaptor 205 and a right upper roof adaptor 210. The left upper roof adaptor 205 and right upper roof adaptor 210 are configured to connect to one another and can be fixedly engaged with a left lower roof adaptor 215 and a right lower roof adaptor 220, respectively, to envelope the stock vehicle roll cage 115. Again, the left lower roof adaptor 215 and right lower roof adaptor 220 connect to one another (and can, additionally, connect to the roll cage) and cooperate with the commensurate left upper roof adaptor 205 and right upper roof adaptor 210 to envelope the vehicle roll cage 115. The connection between the upper and lower roof adaptors and/or connection to the roll cage secures the cab enclosure roof adaptor assembly 250 in place. The left upper roof adaptor 205 and left lower roof adaptor 215 can be individually embodied as separate mirror image elements. Likewise, the right upper roof adaptor 210 and right lower roof adaptor 220 can be individually embodied as separate mirror image elements. This minimizes the size of the respective elements, which reduces handling and shipping costs and facilitates assembly. It should be appreciated that either, or any, of the upper or lower roof adaptor pieces can cooperate with a necessary roof covering top such as rigid removable roof panel assembly 225, and cooperating roof adaptor pieces that serve to enable mounting of rigid removable roof panel assembly 225 roof panels in the absence of an OEM removable hard top (not illustrated) and speaker enclosure 135, which have forms and elements necessary for that purpose.

It should be appreciated that while cab enclosure roof adaptor assembly 250 is illustrated as separate right and left pieces, in other embodiments, the upper roof segment can comprise a single piece and the lower roof segment can comprise a single piece or more than two pieces. The upper and lower roof segments can then be joined as disclosed above to form the cab enclosure roof adaptor assembly 250.

Furthermore, the various embodiments of the cab enclosure roof adaptor assembly 250 can be configured to allow rearward extension to envelope geometrically complex structures such as a roll cage gusset plate 125, or the like, to a less geometrically complex element, e.g., a simple cylindrical element, to create a weather resistant seal. The cab enclosure roof adaptor assembly 250 can be sealed around and/or to any of the various structures associated with the vehicle roll cage 115.

The cab enclosure roof adaptor assembly 250 can be configured to cooperate with an OEM rigid removable roof panel (e.g., a Targa® top style) assembly 225 as illustrated. In FIG. 2, a left OEM roof covering top 230 and right OEM roof covering top 235 are shown. The connection between the roof adaptor assembly 250 and rigid removable roof panel assembly 225 can provide a weatherproof connection. For example, installation of the rigid removable roof panel assembly 225 can engage the cab enclosure roof adaptor assembly 250 in a manner analogous to that of an OEM removable hard top and rear speaker enclosure, both of which it replaces for said mounting purpose. The cab enclosure roof adaptor assembly 250 can incorporate gaskets, latch engagement surfaces, locating and spacing features, and other such forms and elements that cooperate with the rigid removable roof panel assembly 225 in a manner analogous to that of the OEM removable hard top and rear speaker enclosure to allow them to be attached.

OEM rigid removable roof panel assembly 225 panels attach to the vehicle by multiple fastening methods, including a toggle clamp engaging the upper portion of the windshield frame 155, multiple rotary latches which engage both a companion panel and a removable hard top (not illustrated) and hand screws which are located and spaced by forms of the rear speaker enclosure 135, pass through holes in the crossbrace 120, and engage threaded inserts in each of the two individual roof panels associated with roof panel assembly 225. OEM aftermarket or pivoting rigid removable roof panels 400 (shown in FIGS. 4A and 4B) can attach to the vehicle and to the roof adaptor 200, absent a removable hard top and rear speaker enclosure, in a like or similar manner, excepting pivoting roof panels 400 can additionally attach via pivots or hinges. Pivoting roof panels 400 can be disengaged from all attachments other than said pivots or hinges, thus allowing them to be rotated to a stowed position and opening the roof of the cab without necessitating complete removal from the vehicle roof.

FIG. 3 illustrates a completed version of the cab enclosure roof adaptor assembly 250 enveloping the roll cage 115 and cooperating with OEM rigid removable roof panel assembly 225.

The combined upper roof adaptor assembly can connect to, or otherwise cooperate with, the lower roof adaptor assembly, as illustrated in FIG. 2, to cover the top of the vehicle cab 110. The completed cab enclosure roof adaptor assembly 250 can further connect to, or otherwise cooperate with, the rigid removable roof panel assembly 225. The connection between the cab enclosure roof adaptor assembly 250 and rigid removable roof panel assembly 225 can be connected in a weather resistant manner. In other embodiments, the roof adaptor assembly 200 can be configured to cooperate with OEM roof covering top roof panels, OEM roof covering top compatible aftermarket roof panels, or pivoting removable roof panels as disclosed herein. As noted above, the roof adaptor assembly 200 incorporates forms and elements analogous to those of a removable hardtop and rear speaker enclosure to enable full functionality, including weather sealing.

As illustrated in FIG. 3, the cab enclosure roof adaptor assembly 250 can comprise a weather resistant enclosure that covers the rearward roof section of the vehicle cab 110. The cab enclosure roof adaptor assembly 250 can cooperate with OEM, aftermarket, or proprietary roof covering roof panels (e.g., pivoting roof panels 400) to fully cover the forward passenger compartment roof. In certain cases, an embodiment can comprise an arrangement wherein no covering of the sides or rear of the forward passenger compartment is provided. The door 150 can comprise a typical aftermarket lower soft door, as may be employed, in certain embodiments.

Figure 4A:
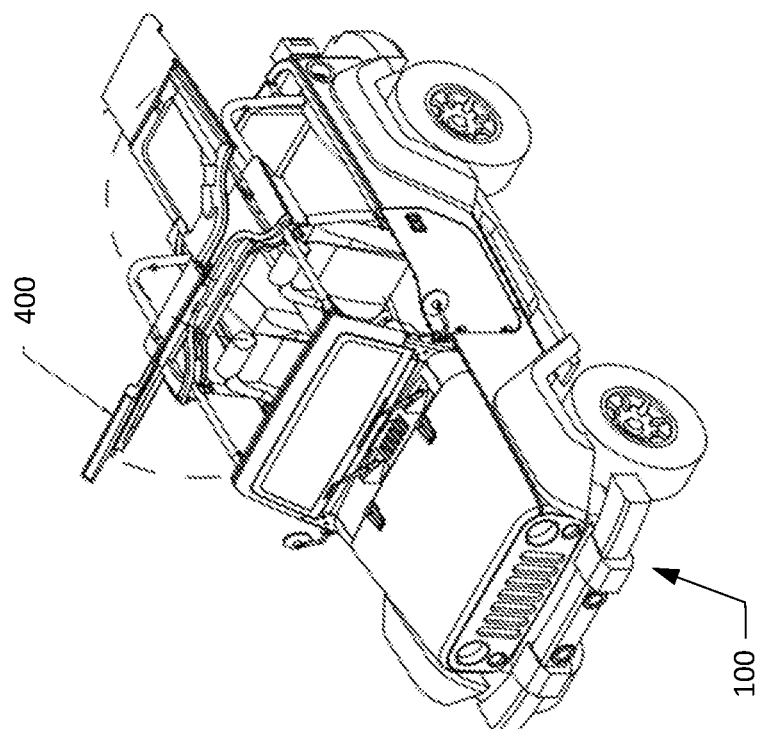
FIG. 4A depicts a roof adaptor and an associated roof covering connected to a vehicle in accordance with the disclosed embodiments.
Figure 4B:
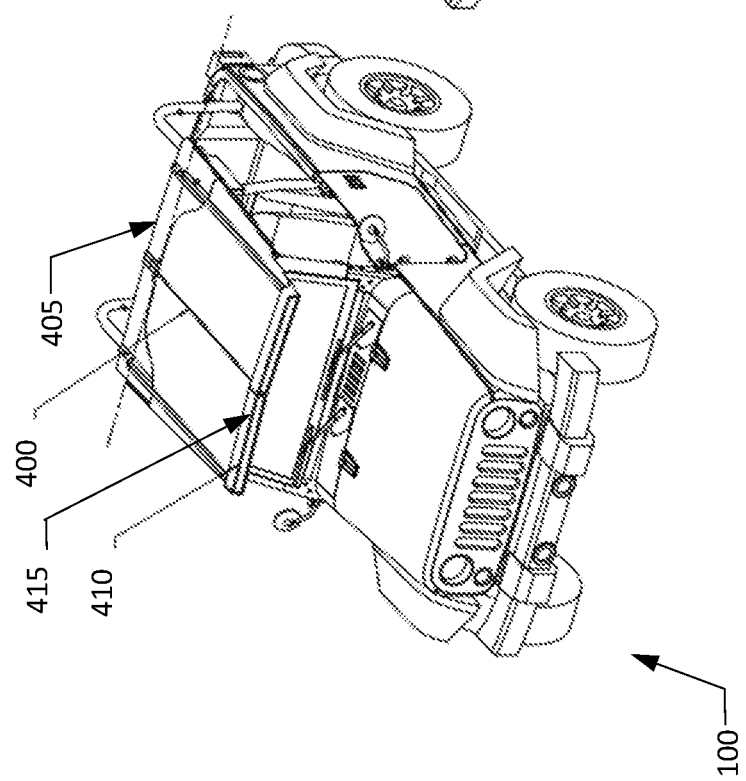
FIG. 4B depicts a roof adaptor and an associated roof covering connected to a vehicle in accordance with the disclosed embodiments.

FIG. 4A and FIG. 4B illustrate another embodiment comprising a pivoting roof enclosure assembly 400. The pivoting roof enclosure assembly 400 provides a means for completing the covering enclosing the cab 110 of a vehicle 100 using the cab enclosure roof adaptor assembly 250, when an OEM roof covering is not utilized.

The pivoting roof enclosure assembly 400 can connect to, or otherwise cooperate with the windshield frame, OEM, or compatible aftermarket doors, or other elements of the vehicle 100. It should be understood that the pivoting roof enclosure 400 can be configured such that it can be removably attached to the cab enclosure roof adaptor assembly 250. In an embodiment, the connection is made via pivots or hinges 405 such that the pivoting roof enclosure assembly 400 can be rotated back to a stowed position above and to the rear of the cab enclosure roof adaptor assembly 250. In operation, this allows the top of the cab to be opened without the removal and storage required with OEM style roof covering roof panels. Stops, steady rests, or the like can be provided to support and secure the rotating roof covering roof panels 400 in the stowed position.

The pivoting roof panels 400 can further be configured to extend forward of the windshield frame to provide a sun visor 410. The pivoting roof panels 400 can incorporate an integral light-bar 415 or other exterior lighting elements, including necessary electrical wiring and connections. In an exemplary embodiment, an integral light bar can be implemented in an element formed by thermoset plastic reaction injection molding (RIM), or other molding process, as a cavity in the forward portion of the panels 400 into which an assembly containing the lighting elements and protective lens is inserted, attached to a wiring and connector harness either integral within or attached to the roof panels and secured by fastening means. It should be understood that this description of the light-bar 415 is exemplary. Numerous alternative forms and fabrication methods could be used for similar details. Other electrically powered features could likewise be incorporated in, or attached to, the pivoting roof panels in other embodiments.

As shown in FIG. 4B, the pivoting roof panels 400 can be rotated rearward to a fully stowed position.

In an embodiment, the cab enclosure 200 can further include a rear bulkhead assembly which can be provided for fully or partially enclosing the cab of a vehicle 100. The rear bulkhead assembly can generally comprise a lower rear bulkhead assembly 505 and an upper rear bulkhead assembly 555. FIG. 5A and FIG. 5B illustrate the lower rear bulkhead assembly 505 both as an assembly (in FIG. 5A) and as connected to a vehicle 100 (in FIG. 5B).

In an embodiment, the lower rear bulkhead assembly 505 comprises a left lower rear bulkhead 510 and a right lower rear bulkhead 515. A left lower rear bulkhead attachment bracket 520 and right lower rear bulkhead attachment bracket 525 are used to connect the lower rear bulkhead 505 with a clamp 530 that is used to secure the bulkhead to the front roll cage uprights. A bulkhead stiffening beam 535 can be connected to the lower rear bulkhead attachment brackets 520 and 525 to provide additional structural support. Brackets 540 are used to secure the bulkhead to the cargo area floor of the vehicle. The brackets 540 can generally connect to existing OEM rear seat latch hard points on the vehicle. A left bulkhead trim piece 545 and right bulkhead trim piece 550 are further provided to complete the assembly as shown. The rear lower bulkhead assembly may also be embodied as a single piece with either an external or internal structural stiffening member.

Figures 6A, 6B:
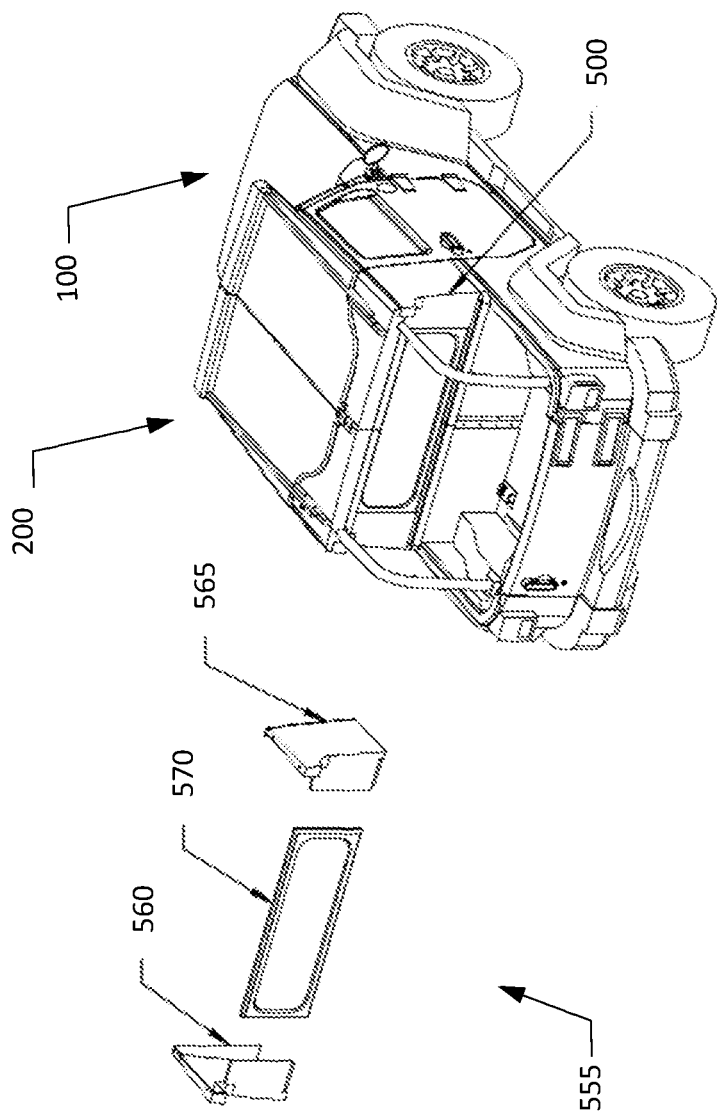
FIG. 6A depicts an upper rear bulkhead assembly in accordance with disclosed embodiments.
FIG. 6B depicts an upper rear bulkhead assembly in accordance with disclosed embodiments.

FIG. 6A and FIG. 6B Illustrate upper rear bulkhead assembly 555 both individually (in FIG. 6A) and installed on vehicle 100 (in FIG. 6B), in cooperation with the cab enclosure roof adaptor assembly 250 and lower rear bulkhead 505. As illustrated, this combination can fully enclose a cab area of vehicle 100, and thus comprises an embodiment of cab enclosure 200. The upper rear bulkhead assembly 555 comprises a left quarter panel 560, a right quarter panel 565, and a rear panel 570. In certain embodiments, the rear panel 570 can further include a rear panel with other desired characteristics.

It should be understood that the rear bulkhead 500 can be embodied as interchangeable elements of various configurations, e.g., a fixed or openable window panel 570 for rearward vision from within the cab. The window panel 570 can comprise a rigid frame and glazing interfaced with said upper bulkhead elements, fabric, and/or flexible polymer glazing or screening removably attached to the upper rear bulkhead assembly 555 with zippers, hook and loop fasteners, or the like to facilitate rapid removal and stowage in the field.

As shown in FIG. 6B, the completed cab enclosure 200 can include the cab enclosure roof adaptor assembly 250, the upper rear bulkhead assembly 555, and the lower rear bulkhead assembly 505; each of which can be employed independently of one another. Installation of the upper rear bulkhead assembly 555, in particular, can cooperate with both the cab enclosure roof adaptor assembly 250 and/or the lower rear bulkhead assembly 505.

In additional embodiments, interior trim can be provided to cover naked structural elements including, but not limited to, the removable windshield braces, a roll cage cross brace, the front roll cage uprights, etc., both for crash protection of vehicle occupants or visual aesthetics. Furthermore, any or all of the roof adaptor assembly 200 and upper rear bulkhead assembly 555 and lower rear bulkhead assembly 505 can further include a thermal/acoustical insulating layer, compartments, open, or enclosed to facilitate storage of items in the passenger compartment interior and other elements of ancillary utility, e.g., power outlets, lighting, audio speaker housings, including associated wiring and connectors, or the like. It should be noted that installation of a fixed deck 700 as described in further detail herein, does not require installation of the lower rear bulkhead assembly 505 or the upper rear bulkhead assembly 555 or the cab enclosure roof adaptor assembly 250.

In certain embodiments, a fixed deck 700 can comprise a substantially load bearing deck spanning laterally and longitudinally upon and over, or within the confines of the vehicle cargo area 105 rearward of the cab 110. The fixed deck 700 can comprise a connection that mutually cooperates with the lower rear bulkhead 505 and thus simultaneously provides an enclosed and substantially securable cargo volume below the fixed deck 700. It should be understood that the fixed deck 700 can be installed without permanent modification of the target vehicle 100. The fixed deck 700 can be embodied as an insulated deck which is useful when the fixed deck 700 is employed as a tent/sleeping platform, or the like, as further detailed herein.

Figures 7A, 7B:
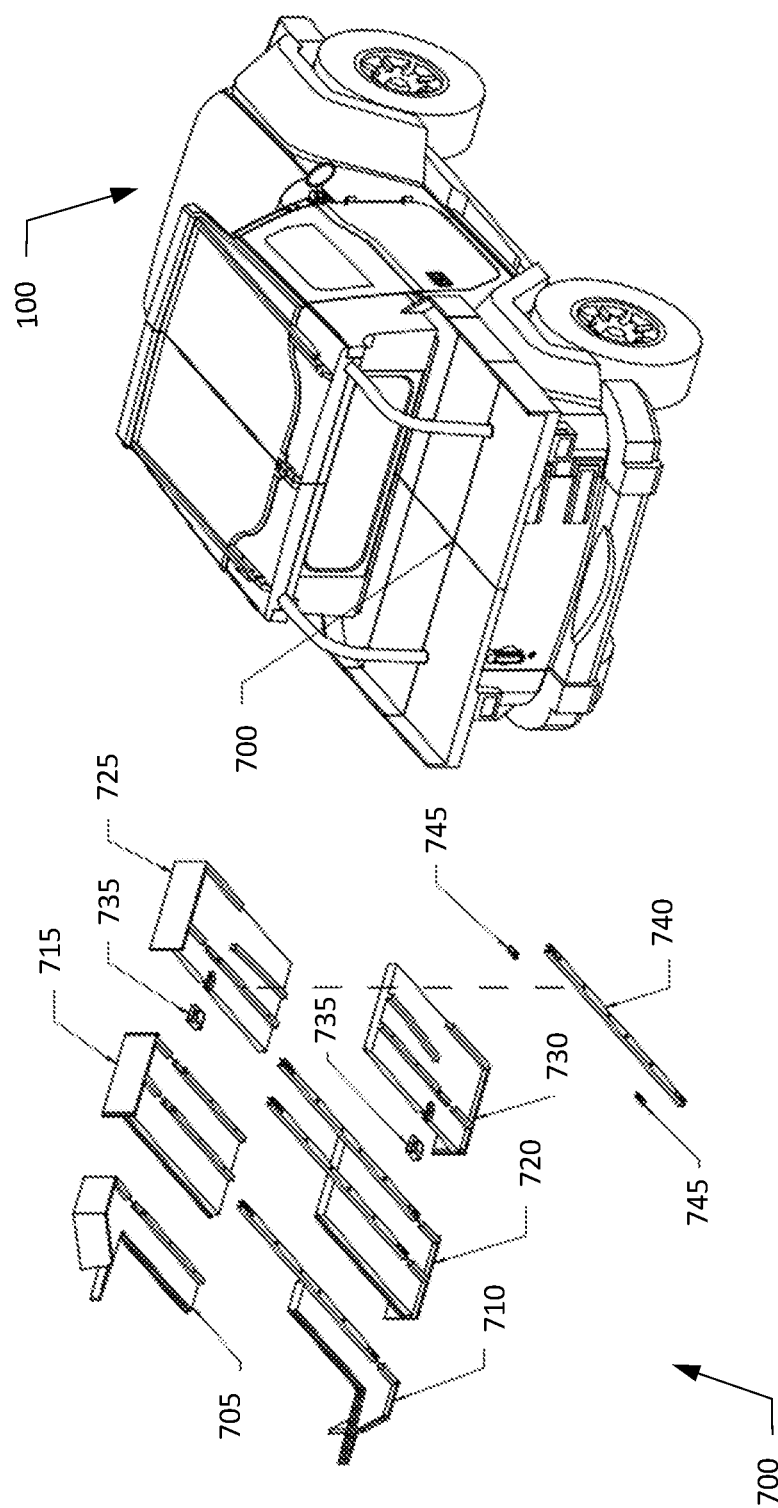
FIG. 7A depicts a fixed deck assembly in accordance with the disclosed embodiments.
FIG. 7B depicts a fixed deck assembly in accordance with the disclosed embodiments.

FIG. 7A and FIG. 7B illustrate the fixed deck 700, both as constituent pieces (in FIG. 7A), and installed on a target vehicle 100 (in FIG. 7B). The fixed deck 700 can comprise a series of interconnected deck boards including a left front deck board 705, right front deck board 710, a left middle deck board 715, a right middle deck board 720, a left rear deck board 725, and a right rear deck board 730. It should be appreciated that in other embodiments, more or fewer deck elements can be used, and the illustration in FIG. 7B is exemplary of one such configuration. In an embodiment, wherein deck elements span the width of the vehicle rather than split as illustrated, structural members can be incorporated into the board elements.

Split gaskets 735 can be provided to seal around a vehicle roll cage. A transverse reinforcing beam 740, with specially formed ends, is used to interface with sliding latch elements 745. The latch elements 745 are configured to slidably engage the underside of the vehicle body rim to secure the deck boards to the vehicle 100. It will be understood by one familiar with the art, that various means exist by which deck elements can rapidly be removably affixed to the vehicle in a secure manner by engaging with existing forms of the vehicle via a variety of fastening methods. The fixed deck 700 can thus be installed on vehicle 100 as shown, with no modification of the vehicle 100.

The fixed deck 700 can provide open or covered storage compartments, either configured specifically for storage of a unique form, or forms (e.g., removable elements of the embodiments disclosed herein), or of a non-application specific configuration to, generally, increase cargo carrying utility. In certain embodiments, storage volumes can be formed by stacking multiple decks and with intervening bulkhead-like dividers. Open or enclosed (e.g., by doors or drawers) storage volumes may be embodied as housings, shelves, and dividers integral to the deck elements or as modular elements provided in a variety of sizes to be attached to the top and/or underside of the deck elements to provide flexibility in implementation of storage requirements.

Additionally, the deck surface can be embodied with forms, and/or materials, either inherent to the materials and methods used for fabrication or by application of coatings or applied materials to generally enhance utility or aesthetics of the fixed deck 700 and/or vehicle 100. For example, the deck can be formed of materials to provide a water resistant non-slip impact and/or wear resistant surface, provide for drainage of liquids, improve visual appeal, provide solar radiation reflectivity to reduce surface temperatures (e.g., silver, white, or other light color base material or coating), or the like. Further, any or all of deck sections 705-730 can be embodied such that they employ a raised exterior edge.

This facilitates the containment of cargo, or the like, in which case provision may be made for scuppers, or the like, that can cooperate with a deck or raised edge surface, or surfaces, to discharge liquid from the deck.

Finally, in certain embodiments, the above disclosed deck sections 705-730, or additional deck sections, can be removably affixed to the rear cargo section of the vehicle 100, and can cooperate with elements of the cab enclosure described above or the extensible deck as described in more detail below. Such deck elements can extend laterally beyond the width of the vehicle body, in vehicles typical of the class, as a result of the fact that the vehicle body is not as wide as the overall vehicle width, where the overall width is the outward extent of the vehicle wheels and/or wheel fenders. The deck elements can thus extend outwardly from the vehicle body to, or nearly to, the overall width of a target vehicle 100 without any increase in the overall vehicle 100 width.

It should be appreciated that the deck sections 705-730 can be fixedly engaged to the vehicle 100 body with clamps or latches engaging the body rim of a vehicle typical of the class, or sidewall rim and/or cargo hold down features in pickups, thereby substantially enclosing the cargo space beneath. In embodiments where the vehicle 100 has a lockable tailgate, the fixed deck 700 thus provides a relatively secure cargo space that can be accessed by unlocking and opening the lockable tailgate.

In other embodiments, additional features can be incorporated. For example, an enclosure can be provided in association with the fixed deck 700 to form an environmentally protected space for cargo or for human occupation. For example, FIG. 8A and FIG. 8B illustrate an accessory enclosure 800 associated with fixed deck 700.

Accessory enclosure 800 is fixedly attached to the fixed deck 700. The accessory enclosure 800 can be fitted with a sleeping mattress 805 located on top of the fixed deck 700. One or more supporting bows 810 can span the width of the fixed deck 700. The supporting bows 810 can comprise hollow tubular segments with elastic cord running through the interior to keep them as a group when stowed. Ends of the bow segments can be provided with cooperating male and female forms to allow segments to be joined. Other means of implementing an enclosure (e.g., a structure with inflatable supporting elements) can be employed in other embodiments.

The accessory enclosure 800 can further include covering 815 that can be constructed of a water-proof fabric and can include windows, insect resistant screening, rainflies, etc. The covering 815 can be configured with openable end panels 820 to provide access to the interior of the accessory enclosure 800. In certain embodiments, the openable end panels 820 can be removed completely to allow the accessory enclosure 800 to cooperate with an extension as may be employed when utilizing an extensible deck apparatus as further detailed herein. In other embodiments, the accessory enclosure 800 can be accessed through the vehicle cab 110.

Figure 18:
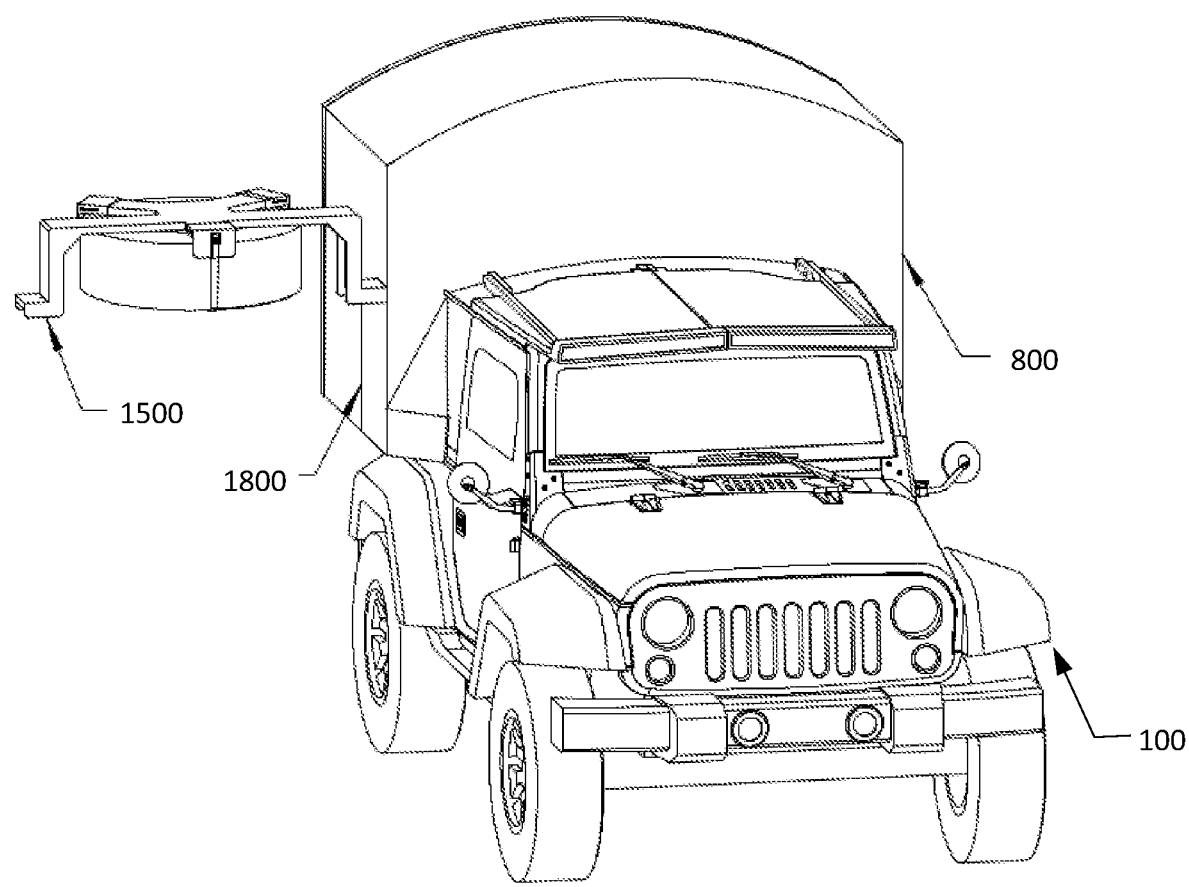
FIG. 18 depicts a spare wheel/tire mounting apparatus in a deployed position to accommodate an enclosure in accordance with the disclosed embodiments.

In cases where a vehicle roll cage is present, the enclosure 800 can fit over the roll cage and can thus fit securely to the cab enclosure (as shown in FIG. 18). The roof adapter assembly 200 and rear bulkhead assembly side panels can additionally incorporate grooves, ribs, or other such forms to cooperate with the enclosure 800 to further improve weather resistance.

It should be appreciated that while the figures provide herein illustrate the fixed deck 700 formed on a convertible SUV vehicle 100, in other embodiments, the fixed deck 700 can be used with other vehicles including certain configurations of light trucks, e.g., pickup trucks, for a similar purpose. In particular, the cargo bed associated with such light trucks is of sufficient length and width to accommodate multiple people and/or cargo. Utilization of a fixed deck 700 with transversely spanning deck panels placed upon the cargo bed sidewalls, therefore, may provide similar benefits as described herein for vehicle 100. In certain embodiments, pickup trucks have a cargo bed with transverse dimensions that are nearly the overall width of the vehicle, excepting the interior intrusion of rear wheel housings. Placement of a load-bearing fixed deck 700, fabricated by materials and methods providing the desired load-bearing capacity inherently and/or by the addition of beams 740, or the like, either incorporated into the deck elements at manufacture or as separate elements attached during assembly, upon the top of the cargo side walls and extending to the full width of the vehicle can provide additional useful area for uses as described herein. In addition, employment of a fixed deck 700 with one or more sections allows installation of, and cooperation with, an extensible deck section as further disclosed herein. In certain embodiments, an extensible deck 900 (as shown in FIG. 9A) can be employed on trucks, as described, absent the installation of a fixed deck 700.

In certain embodiments an extensible deck 900 can be installed on a vehicle 100. The extensible deck comprises a rearwardly extensible deck section that provide additional cargo area or a tent/sleeping platform, or the like. The extensible deck 900 can work in cooperation with the fixed deck 700.

Figure 9A:
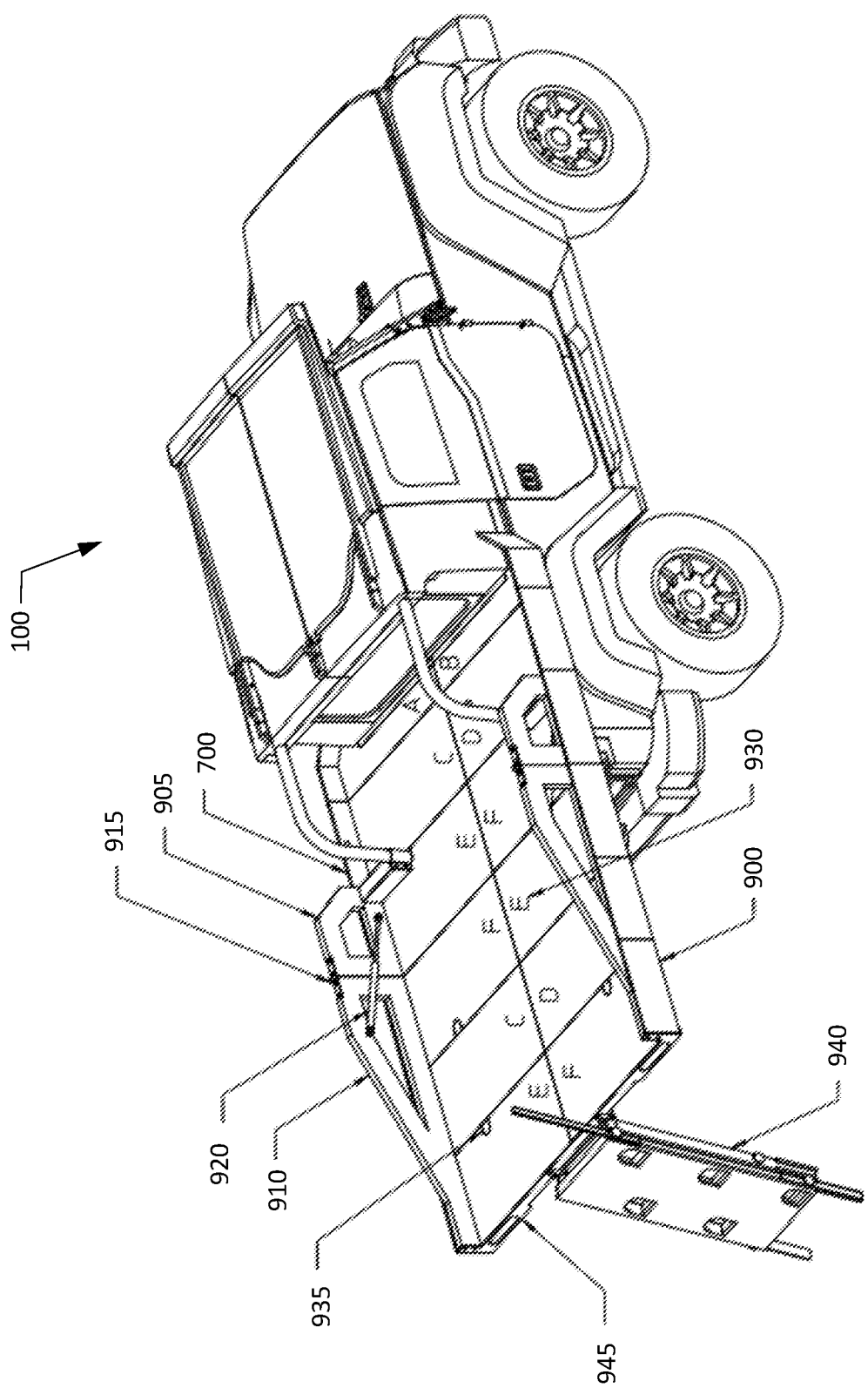
FIG. 9A depicts an extensible deck assembly in accordance with the disclosed embodiments.
Figure 9B:
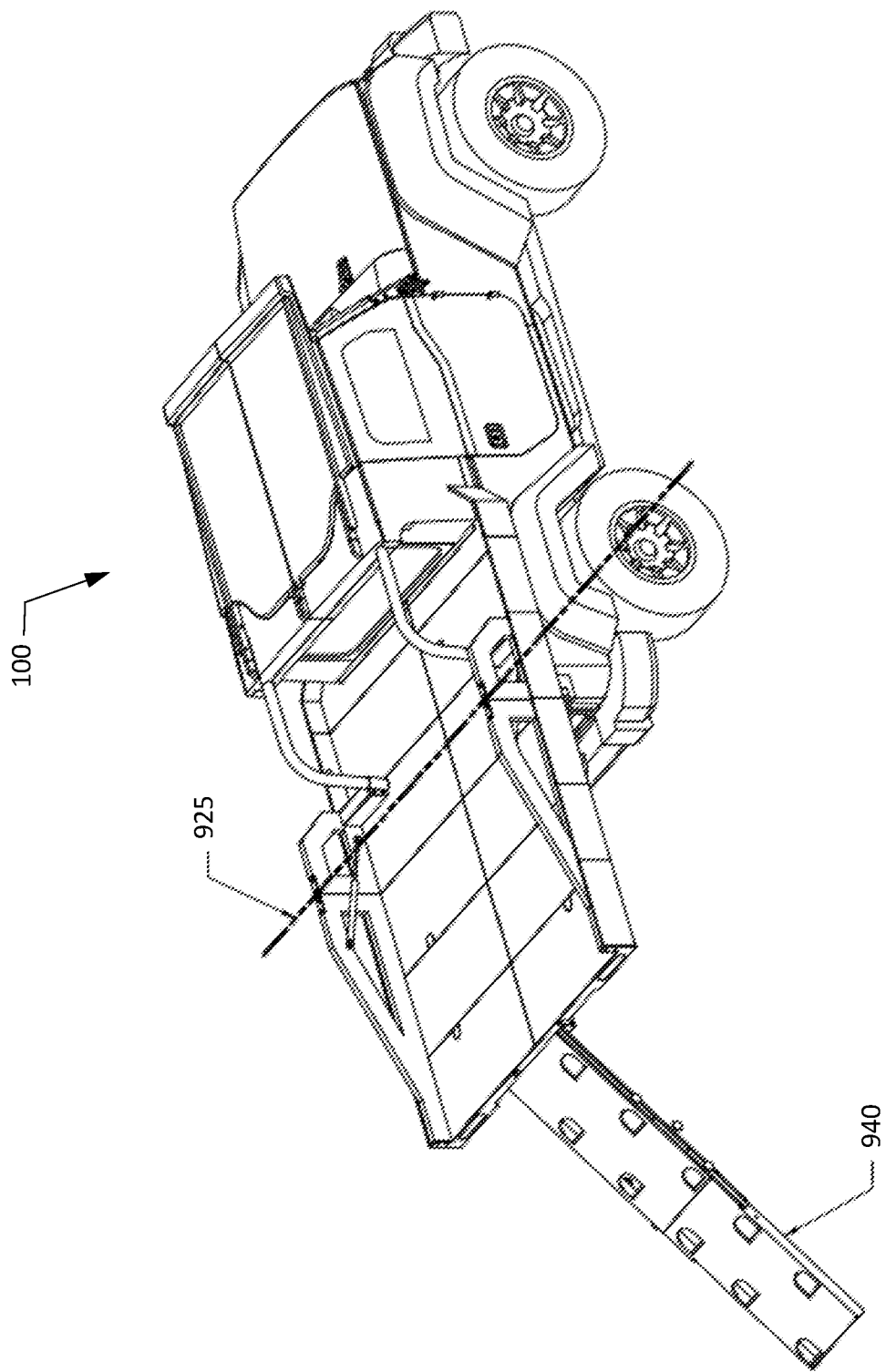
FIG. 9B depicts an extensible deck assembly in accordance with the disclosed embodiments.

FIG. 9A illustrates the extensible deck 900 associated with a vehicle 100. As illustrated herein, the extensible deck 900 provides the ability to extend an additional deck section outward from the rear of a vehicle. A fixed structural support 905 can be non-permanently affixed to a roll cage member. A movable structural support 910 can be attached to deck board elements, underlying transverse beam elements 740 and transverse end beam element 945 of the extensible deck 900. A pivot 915 can be attached to the extensible deck 900 in cooperation with a mating pivot element on the structural support 905 in order to allow the extensible deck 900 to be rotated into a different position. Load control structure 920 can prevent uncontrolled rotation of the extensible deck 900 to either a stowed or deployed position. The load control structure 920 can be embodied by utilizing any of a number of operating principles, e.g., hydraulic, pneumatic, friction, etc., that retard linear or rotary motion (as would an automobile shock absorber). Centerline 925 of the pivots is illustrated in FIG. 9B. The pivots, with a common centerline, serve to allow the extensible deck 900 to be rotated into a stowed or deployed position.

In addition, the extensible deck 900 can include a series of interconnected deck boards 930. The deck boards can be fabricated similar to, and operate in an essentially equivalent manner to, those of the fixed deck 700. The deck boards illustrated in FIG. 9A include letters indicating potential commonality of deck board elements between the fixed deck 700 and extensible deck 900.

The deck boards can have a series of holes which can be filled with hole filler plugs 935 as necessary. The holes are provided because the same deck elements can be used locations where they need to fit around a roll cage member, and in other locations where they do not. This is illustrated in FIG. 9A where, for example, deck board "E" has to accommodate passage of the rear roll cage tube when used on a fixed deck, but can also be used on the extensible deck where there is no roll cage. When the deck element fits around a roll cage member, a split gasket 735 can be included to seal the interface. When the hole is not in a location with a roll cage member, a hole filler plug 935 blocks the opening.

In certain embodiments, the support 905 could be sufficient, absent presence of a fixed deck 700, to allow use of extensible deck 900 (or an associated framework with equipment attachment features) without use of a fixed deck. The structural support can rest on the deck, but can be attached to the roll cage. When used on a pickup, a structural support can have fasteners extending through the deck (if used) to engage typical cargo securement points in the vehicle cargo area sidewalls.

An access ladder 940 can be provided to facilitate use of the extensible deck 900. It should be appreciated that the ladder 940 can be embodied as a ladder for human use, or ramp that serves both for human use and to facilitate the loading and unloading of cargo. The ladder 940 can be non-permanently attached to the transverse end beam 945 with disconnectable pivots/hinges. In FIG. 9A, the ladder 940 is shown with the ladder/ramp extension stowed. In FIG. 9B, the ladder 940 is shown with ladder/ramp extension deployed. The ladder 940 can further be configured with an extensible hand rail and extensible feet to bear against varying ground levels to provide support. An extensible hand rail or similar foot elements can be embodied wherein a linear element slidably engaged within a linear "C" section element incorporated in or attached to the body of the ladder element at either side, can slidably engage within similar "C" section elements of the ladder extension to support it in the deployed position. The deck elements 930 of the extensible deck 900 can extend laterally beyond the width of the vehicle body, without issue, in vehicles typical of the class, as a result of the fact that the vehicle body is not as wide as the overall vehicle width, as described herein. The extensible deck 900 can also be applied in certain light truck configurations, as described above, for the fixed deck 700.

Figure 10:
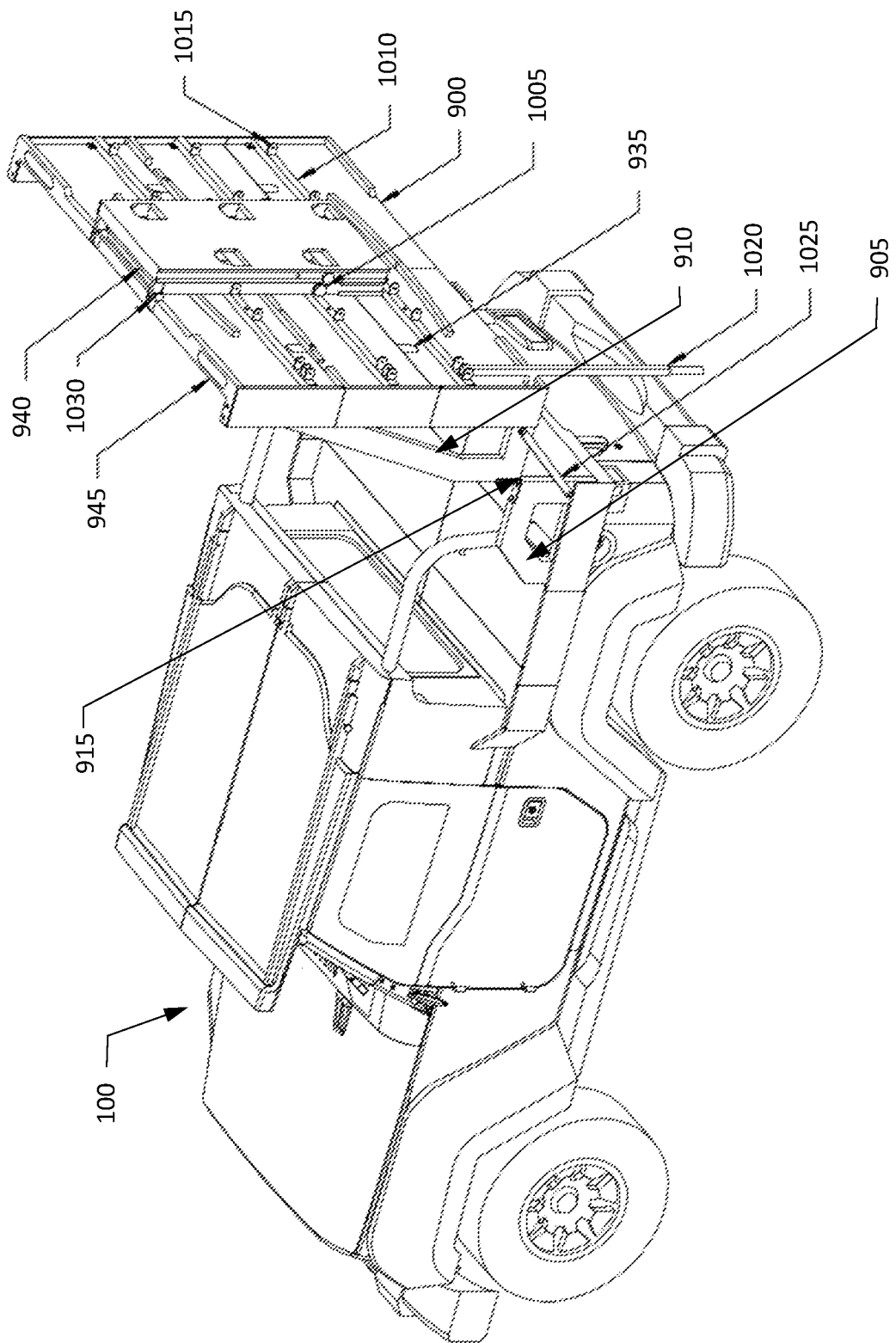
FIG. 10 depicts an extensible deck assembly in a partially stowed configuration in accordance with the disclosed embodiments.
Figure 11B:
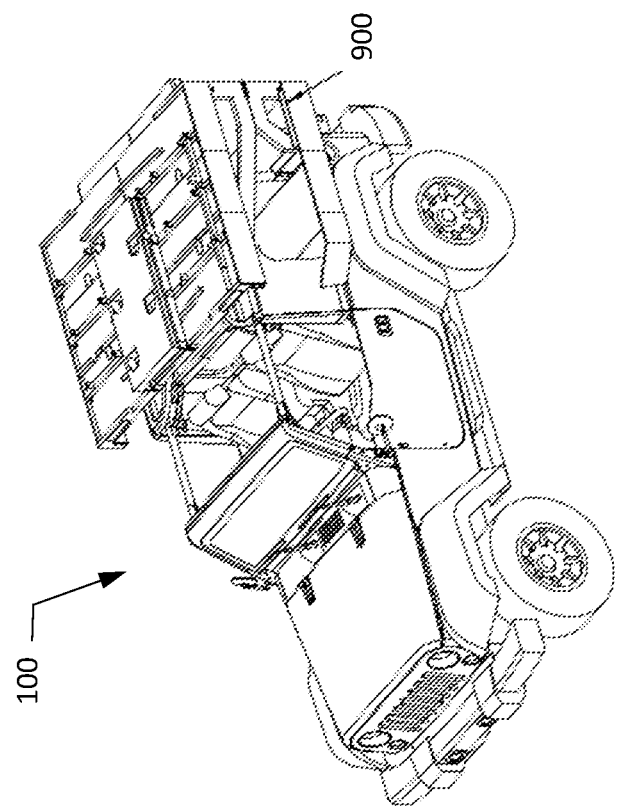
FIG. 11B depicts an extensible deck assembly in a fully stowed configuration in accordance with the disclosed embodiments.
Figure 11A:
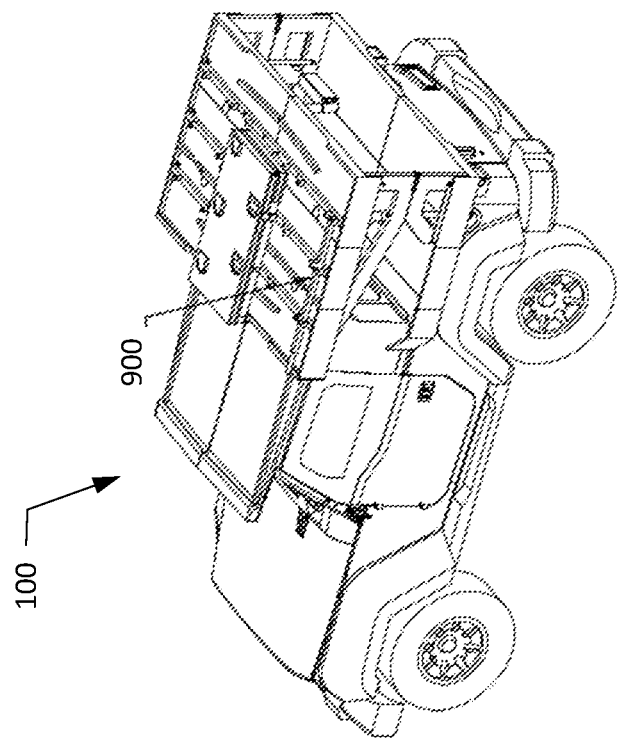
FIG. 11A depicts an extensible deck assembly in a fully stowed configuration in accordance with the disclosed embodiments.

FIG. 10 illustrates the extensible deck 900 in a half-deployed position. This illustrates a configuration that would be useful for various purposes as further described herein. FIG. 11A Illustrates the extensible deck 900 in a fully stowed position. Note the extensible deck 900 can be rotated to be in a substantially parallel plane offset to that of the fixed deck 700. In FIG. 11A and FIG. 11B, the pivoting roof panels 400 are shown in their deployed position (in FIG. 11A) and their stowed position (in FIG. 11B), respectively. The extensible deck 900 can repose above the stowed pivoting roof panels 400 in a stowed position. The extensible deck support structure 905 and extensible deck 900 can incorporate elements to secure the extensible deck 900 in the stowed position during vehicle operation.

The extensible deck 900, as shown in the half-deployed position in FIG. 10, can allow the ladder/ramp 940 to be released from its stowed position prior to deployment. The extensible deck 900 can include a deployment assistance lever 1020 which can be stowed prior to full deployment of the extensible deck 900. The extensible deck 900 can serve to mount or dismount a spare wheel/tire. The extensible deck can provide various attachment points for recreational or occupational equipment to be transported (e.g., bicycles, kayaks, surfboards, ladders, etc.).

In FIG. 10, the extensible deck 900 and ladder 940 are secured in the stowed position with a ladder/ramp fastener 1005. The extensible deck can be supported by one or more transverse structural beams 1010, which lend structural support to the extensible deck 900 elements by attachment to the pivot support structures 910 at either side.

A series of one or more attachment elements 1015 on the transverse beams 1010 allow either general purpose cargo attachment or apparatus specific attachment for certain cargo (e.g., bicycles, kayaks, surfboards, ladders, etc.) to be attached to extensible deck 900.

An extensible deck deployment assistance lever 1020 can be provided to facilitate deployment/stowage of the extensible deck 900. The deck deployment assistance lever 1020 can be mounted on either side of vehicle 100 during initial assembly of the embodiments disclosed herein by reversing orientation of transverse structural beams 1010 to which it is attached by a pivot. The deployment assistance lever 1020 works as a lever arm, reducing the amount of effort required to rotate the extensible deck 900. The deployment assistance lever 1020 works in cooperation with the load control elements 910 to assist the operator in deploying or stowing the extensible deck 900. When the extensible deck 900 is stowed, the deployment assistance lever 1020 can be deployed and rotated 180 degrees to aid in rotation of the extensible deck 900 to the upright partially deployed position by pulling down on the lever. It should be understood that the lever, as shown, can be stowed before fully rotating the extensible deck 900 to full deployment position. In other embodiments, the deployment assistance lever can be located outboard, for example, by attachment to the support structure 910 instead of to the bottom of the extensible deck 900, far enough to allow it to be used to fully deploy the extensible deck 900. Once the fully deployed extensible deck 900 is rotated to the upright position, the lever 1020 can be deployed and the extensible deck 900 can be rotated to the fully stowed position by pulling up on the lever, after which the lever would be rotated by to its stowed position and secured.

A deployable prop 1025 can be affixed to the extensible deck 900 to support the extensible deck 900 in a half-deployed position as shown in FIG. 10. The deployable prop 1025 can be mounted on either side of vehicle 100 during initial assembly of extensible deck 900. In FIG. 10, hole plugs 935 are illustrated. In addition, the rear transverse structural beam 945 and the ladder 940 pivots 1030 are shown, which allow the ladder 940 to be rotated to a deployed position.

In an embodiment, the extensible deck 900 can be configured as a framework attached to, and operating in the same way as, the embodiments described above, but lacking the solid deck members. This embodiment enables the carrying of equipment with various attachment points configured on the framework. In the case where the embodiment is employed with a standard cab pickup, a fixed deck resting on the cargo area side walls could accommodate cargo or several people, while providing a secure cargo area in the pickup bed below. An extensible deck, embodied as a framework with utility attachments, would be useful for attaching gear. Items can be loaded to the extension when it is upright behind the vehicle. The extensible deck framework can be rotated into its top position making the loading of gear more convenient than the use of a standard fixed roof rack.

Figure 12:
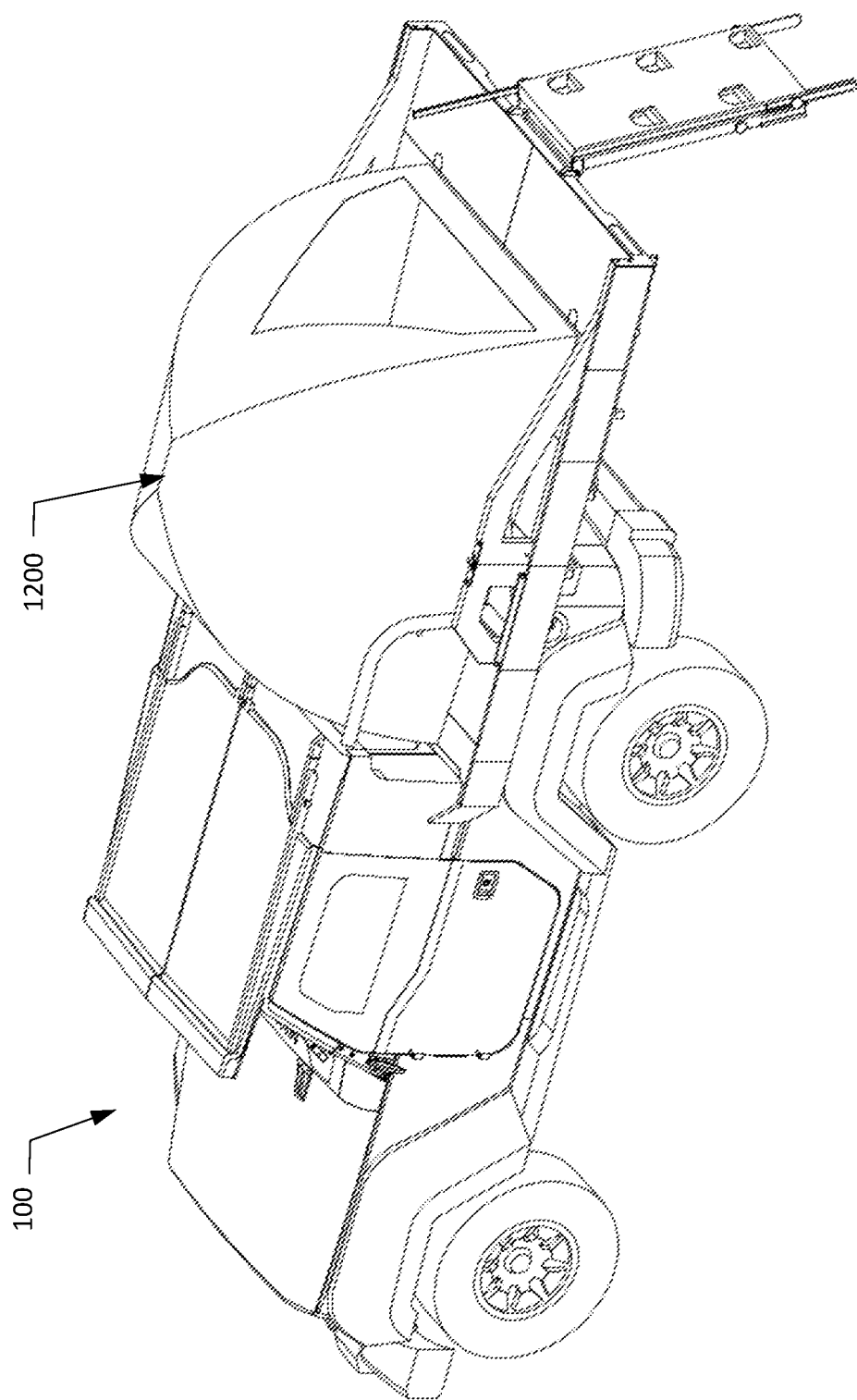
FIG. 12 depicts an extensible deck assembly with an associated enclosure in accordance with the disclosed embodiments.

As with the fixed deck 700, additional ancillary elements, such as an enclosure, can be provided to allow use of the extensible deck 900, in cooperation with the fixed deck 700, for additional applications including, but not limited to, environmental protection to occupants, environmental protection to cargo, or the like. In such embodiments, an environmental enclosure comprising a camp tent 1200 can be installed on the fixed deck 700 and the extensible deck 900. FIG. 12 illustrates a combined fixed deck and extensible deck environmental enclosure comprising a camp tent 1200.

FIG. 13A and FIG. 13B illustrate a fixed deck enclosure 800 with accessory enclosure 1300 extending therefrom on the extensible deck 900. The accessory enclosure 1300 can further accommodate a sleeping mattress 1305 that can fit two people, or can be comprised of multiple single person camp mattresses. As with the fixed deck enclosure 800, the extensible deck enclosure 1300 can include enclosure support bows 1310 configured as the internal structure for an outer cover 1315. End panels 1320 can be installed. In certain embodiments, the accessory enclosure 1300 can comprise an extension of the fixed deck enclosure 800 with end panels 820 re-installed to extend the enclosure 800 to complete full enclosure of the combined fixed deck 700 and extensible deck 900. It should be understood that the environmental enclosure can, thus, incorporate a substantially similar structure to accessory enclosure 800, except that accessory enclosure 1300 is generally larger and can accommodate more people or cargo.

Figure 14B:
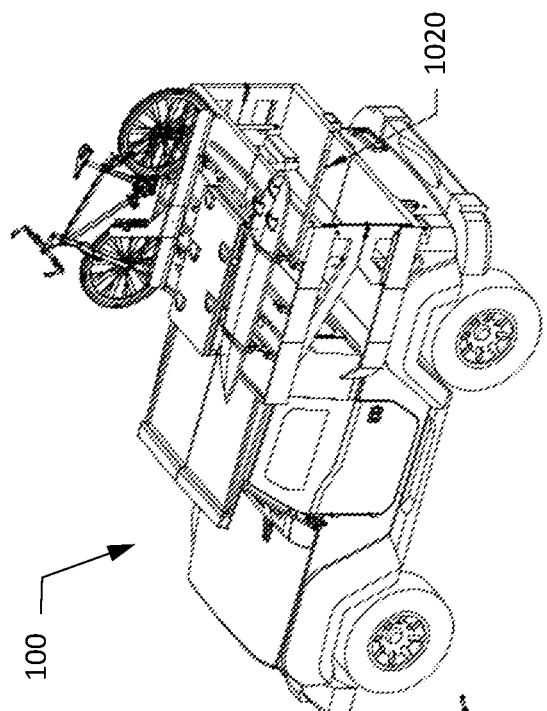
FIG. 14B depicts an extensible deck assembly in a fully stowed configuration in accordance with the disclosed embodiments.
Figure 14A:
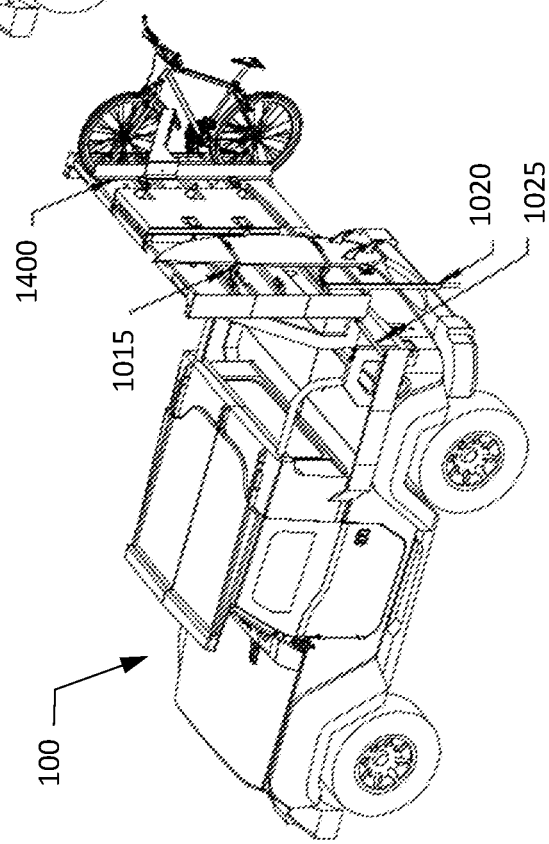
FIG. 14A depicts an extensible deck assembly in a partially stowed configuration in accordance with the disclosed embodiments.

FIG. 14A illustrates an exemplary embodiment wherein the extensible deck 900 is in a half-deployed position to facilitate mounting of equipment with accessory apparatus 1015 and 1400 for transport. FIG. 14B further illustrates extensible deck 900 in fully stowed position and ready for vehicle operation. As shown, accessory attachment elements 1015 and 1400 can be used, for example, for mounting a surfboard and a bicycle attached to the extensible deck 900 via attachment elements 1015 on underside of extensible deck 900.

The deck deployment assist lever 1020 is shown, which can be securable in a deployed position to facilitate rotation of extensible deck 900 either to, or from, a half-deployed position. Deployable prop 1025 is also illustrated and serves to support the extensible deck 900 in a half-deployed position to facilitate mounting of equipment to the deck.

In another embodiment, an apparatus compatible with installation of the embodiments disclosed herein can comprise a tire mount used to mount a spare wheel/tire to the structural roll cage elements such that said spare wheel/tire may be carried above the cargo area when stowed, and can be deployed outboard of the vehicle, either to clear the volume above the cargo area for other uses or to dismount the spare from the vehicle.

Figure 15:
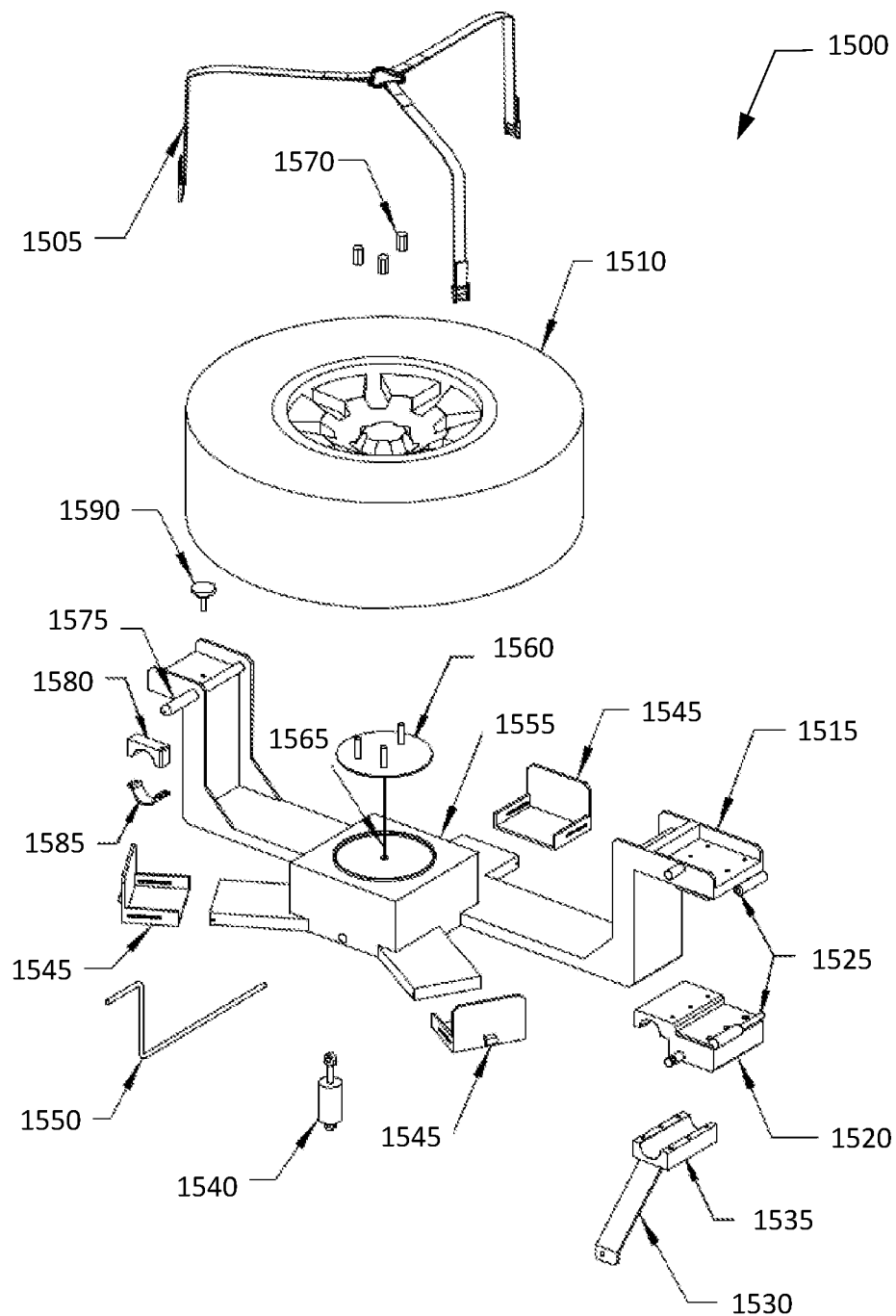
FIG. 15 depicts a spare wheel/tire mounting apparatus in accordance with the disclosed embodiments.

FIG. 15 illustrates a spare wheel/tire mounting apparatus 1500, in accordance with an embodiment of the invention. The apparatus 1500 includes a wheel/tire hold-down 1505 comprising a set of extending arms or straps that can fit over spare wheel/tire 1510. A spare wheel/tire support 1515 is connected to a pivot block 1520 via pivots 1525. An anti-rotation arm 1530 can be connected to the pivot block clamp 1535. A motion control assembly 1540 is used to prevent uncontrolled descent of the pivoting apparatus to either a stowed or deployed position. The motion control assembly can be embodied by utilizing any of a number of operating principles, e.g., hydraulic, pneumatic, friction, etc., that retard linear or rotary motion (as would an automobile shock absorber).

Adjustable tire locators 1545 are provided to engage the tire perimeter and are made adjustable to accommodate various tire diameters. A winch hand crank 1550 can be used to deploy a winch cable 1565 held in the winch housing 1555, which can be located, as shown, or outboard of the mounted spare wheel/tire. A wheel/tire mounting plate 1560 is connected to the winch contained within housing 1555 via a cable 1565. Wheel lug nuts 1570 can connect with studs provided on the wheel/tire mounting plate 1560.

A handle 1575 is provided to facilitate stowage or deployment of pivoting wheel/tire mounting apparatus 1500. A stop block 1580 is connected to a stop block retainer 1585 with a pivoting apparatus securement element 1590. The spare support 1515 rests on the stop block 1580 in the stowed position and a fastener 1590 inserts through a hole in the support and into the retainer 1585 to secure it. It should be understood that in other embodiments, other similar methods of fastening, attachment, securement, etc., can be employed as disclosed herein.

Figure 16:
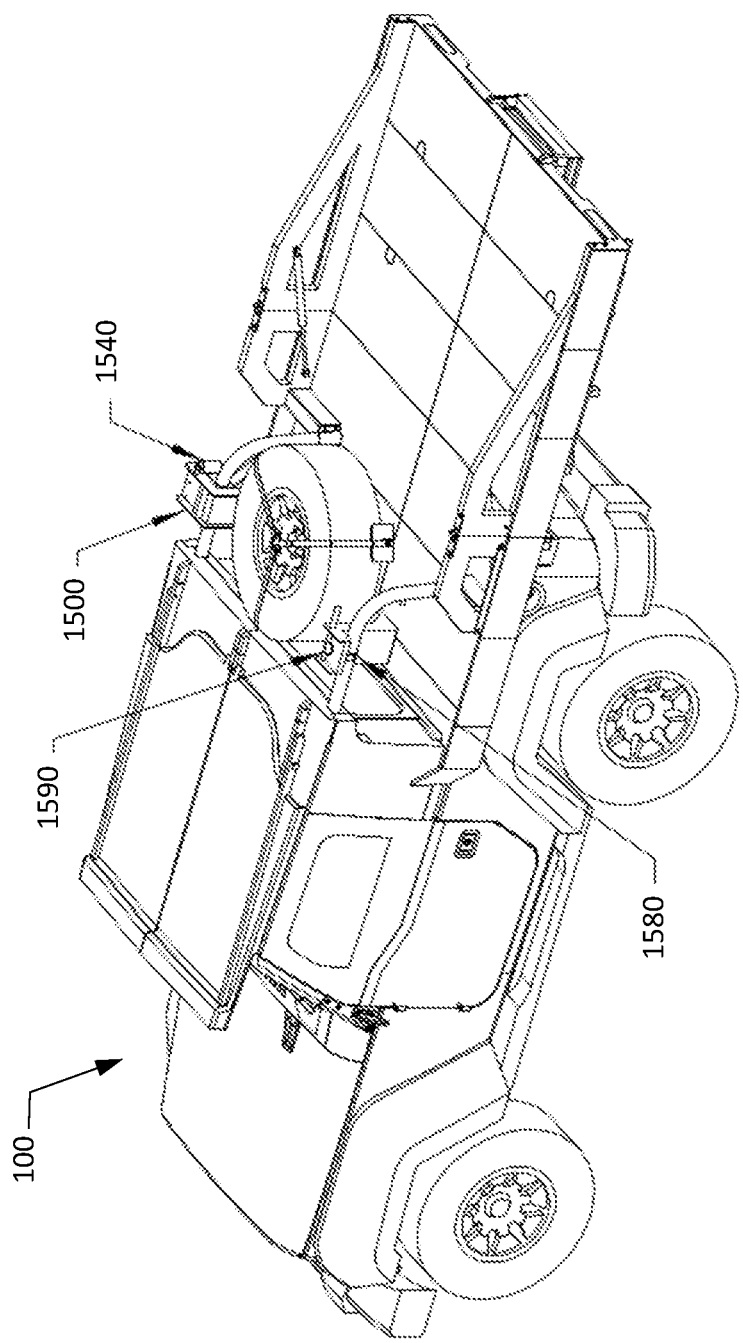
FIG. 16 depicts a spare wheel/tire mounting apparatus in association with a fixed deck and extensible deck in accordance with the disclosed embodiments.

FIG. 16 illustrates the spare wheel/tire apparatus 1500 installed on vehicle 100 in a stowed position. In particular, FIG. 16 illustrates the stop block 1580 attached to roll cage tube. The pivoting apparatus securement element 1590 is shown with the spare support apparatus 1500 in a stowed position. As illustrated in FIG. 16, the stop block 1580 can be clamped to a roll cage tube by a retainer 1585. The motion control assembly 1540 prevents uncontrolled descent of the apparatus 1500 to either a stowed or deployed position. It should be appreciated that this embodiment of apparatus 1500 is fully compatible with stowage of pivoting roof panels 400 and stowage of extensible deck 900.

Figure 17:
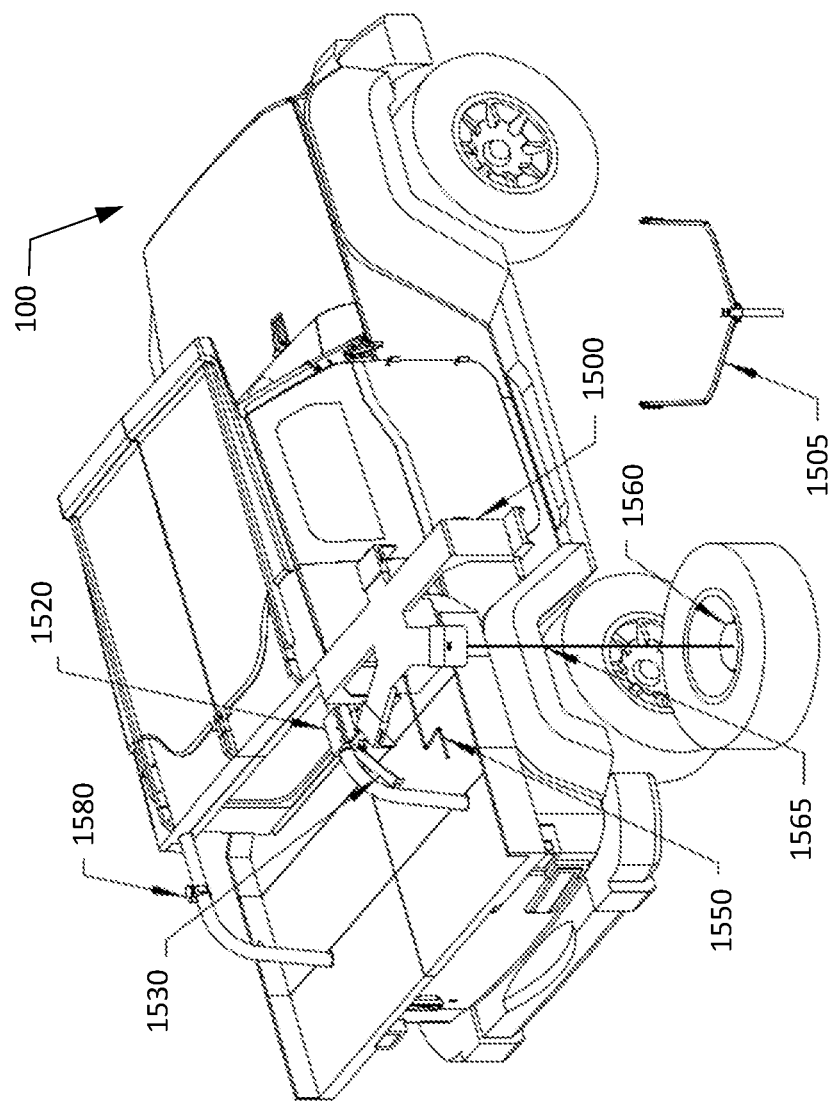
FIG. 17 depicts a spare wheel/tire mounting apparatus deploying a spare in accordance with the disclosed embodiments.

FIG. 17 further illustrates the pivoting spare wheel/tire apparatus 1500 in a deployed position with the spare wheel/tire 1510 being lowered via a winch cable to ground level for access. As shown, the pivoting spare apparatus 1500 can be pivoted away from the vehicle so that the tire can be lowered to the ground. In order to lower the tire/wheel 1510, the winch cable 1565 can be extended or retracted with the winch hand crank 1550 to lower or raise spare wheel/tire 1510 from or to the vehicle mounting location.

The tire/wheel 1510 can be secured to the mounting plate studs 1560 with lug nuts. The stop block 1580 and pivoting apparatus stowage securement element are used to release the arm of the pivoting spare wheel/tire apparatus 1500. The anti-rotation arm 1530 on the pivot block can be secured to an existing vehicle mounting point (e.g., a rear seat shoulder belt anchor point or other such point). The anti-rotation arm 1530 prevents torque generated by rotation of the heavy cantilevered load of the spare tire pivoting apparatus from twisting the clamp block 1520 around the cylindrical roll cage element, or other such mounting point. As shown, the spare wheel/tire holddown 1505 must be disconnected to release the spare wheel/tire 1510.

FIG. 18 Illustrates the pivoting spare wheel/tire apparatus 1500, with the spare in a stowed position on the apparatus, but deployed outboard of the vehicle to clear volume above fixed deck 700 for habitation within an enclosure 800. A sealable flap 1800 in the side wall of the enclosure 800 can allow the covering to be installed around the spare mounting apparatus 1500 in a deployed position.

Figure 19:
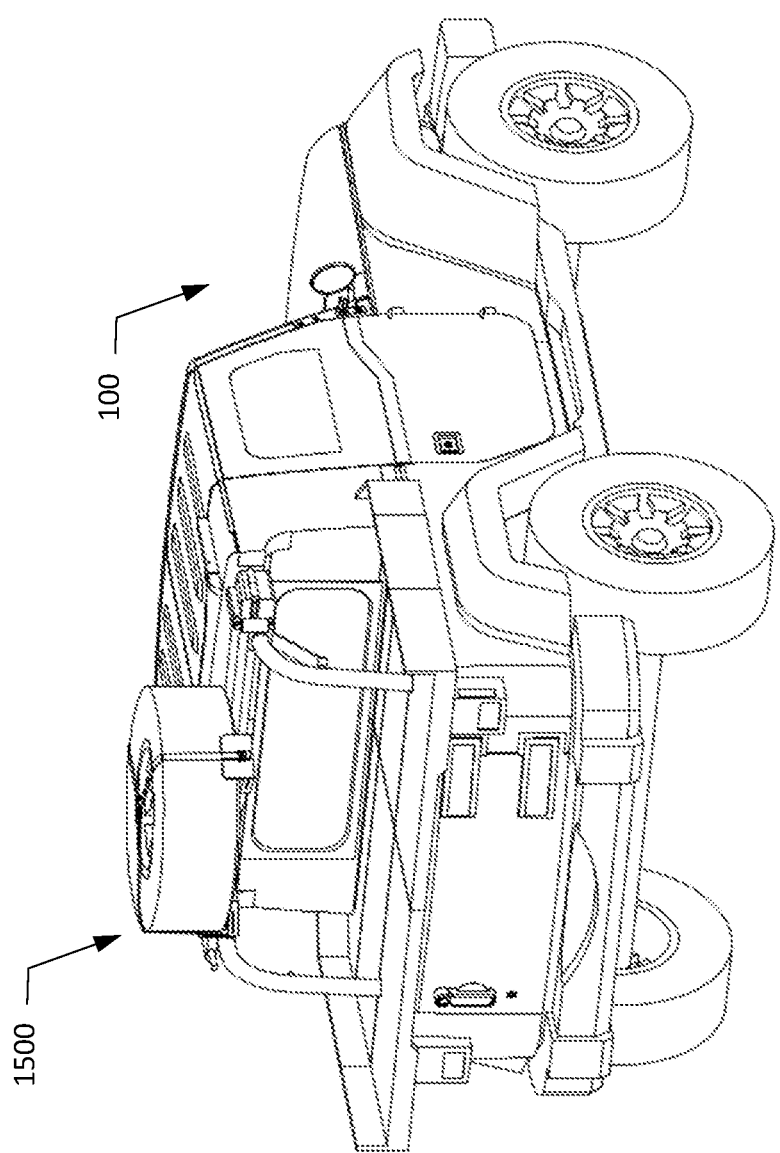
FIG. 19 depicts a spare wheel/tire mounting apparatus and cab enclosure in accordance with the disclosed embodiments.

FIG. 19 illustrates an embodiment of the spare wheel/tire mounting apparatus 1500. In such embodiments, the spare wheel/tire mounting apparatus 1500 can be configured above the fixed deck 700 in an alternate position. This provides increased volume for cargo above or on the fixed deck 700, and an unobstructed view through a cab rear window. Such an alternate position can be employed in embodiments of the invention not utilizing either pivoting roof panels 400 or extensible deck 900 wherein a spatial incompatibility may exist.

It should be understood that, while a benefit of the disclosed embodiments is the installation of any, or all, of the various features or aspects without requiring the permanent modification of the vehicle, substantially similar apparatus and elements may be embodied in a manner that do require permanent modification of the vehicle while substantially retaining other benefits as described herein. Further, although the basic systems, apparatus, and elements and/or sub-elements disclosed herein can be embodied such that elements of the apparatus may cooperate with one another, nothing should be interpreted to preclude the utilization of any single, or multiple apparatus or elements, without the utilization of, or cooperation with, other embodiments. For example, in certain embodiments the use of a fixed deck and/or extensible deck without cooperation with a half-cab enclosure is envisioned, as may be employed on certain classes of light trucks as described herein. In certain embodiments, the systems, apparatus, elements, and/or sub-elements disclosed herein can be further configured to incorporate electrical accessories including, but not limited to, exterior or interior lighting, accessory power outlets, audio speakers, or the like, along with the necessary associated electrical wiring and connectors. Furthermore, in certain embodiments a multiplicity of tents or bivouac bags, or the like, and/or bespoke partial or full enclosures, can be employed in cooperation with any, or all, other basic system elements and/or sub-elements for the purpose of, for example human habitation, cargo volume enclosure, or the like.

It should further be understood that visual representation of hardware or fastening methods or details of the elements are intended to be simple and comprehensible in the figures and are not intended to represent exclusive embodiments of such details. Visual representation of sub-elements of the embodiments comprising, for example, panel elements, and/or deck elements and/or bulkhead-like dividing elements and/or trim elements, or the like, can be made as if such elements were embodied by methods, and/or with materials, that provide for the combining of multiple benefits in single element, e.g., manufacturability, weather resistance, visual appeal, light weight, ease of handling, moderation of shipping costs, ease of installation, etc., which embodiment may be comprised of an element with substantially solid exterior surfaces, which can be formed with significant detail, as may be of benefit in providing function or visual appeal, or the like, while simultaneously incorporating an interior volume substantially consisting of a gas-filled closed-cell foam, or the like, with sufficient structural strength and substantial thermal/acoustical insulating properties as might be achieved by a thermoset plastic reaction injection molding (RIM) process. Further, it should be understood that embodiments illustrated herein as if fabricated with the properties and methods described may be represented as incorporating gross surface forms and/or textures and/or the inclusion of additional sub-elements during forming and/or the post forming addition of other elements, e.g., fastening hardware, or the like. Further, that the embodiments of certain structural elements may be illustrated as if they were embodied utilizing tubular structural members or formed cross section members, as may be embodied by a multiplicity of methods and materials.

Based on the foregoing, it can be appreciated that a number of embodiments, preferred and alternative, are disclosed herein. For example, in one embodiment a system comprises a cab enclosure configured to interface with a vehicle cab, a fixed deck, configured rearward of, and cooperating with, the vehicle cab, and an extensible deck projecting from, and cooperating with, the vehicle.

In an embodiment, the cab enclosure further comprises a roof adaptor, configured to cover the rearward portion of the vehicle cab. In an embodiment the cab enclosure further comprises a rear bulkhead assembly configured around the vehicle cab.

In another embodiment, the cab enclosure further comprises a roof adaptor, configured to cover the rearward portion of the vehicle cab, a roof panel that interfaces with the roof adaptor and covers a frontward portion of the vehicle cab, and a rear bulkhead assembly configured around the vehicle cab wherein the cab enclosure encloses the vehicle cab without permanent modification to the vehicle.

In an embodiment, the fixed deck further comprises at least one structural deck section covering a cargo area of the vehicle wherein the fixed deck is substantially load bearing. In an embodiment the fixed deck is attachable to the vehicle without permanent modification of the vehicle.

In another embodiment, the extensible deck further comprises at least one support member connected to the vehicle and at least one deck section connected to the support member.

In an embodiment, the system further comprises at least one pivot connecting the at least one deck section to the vehicle wherein the pivot allows the deck section to be rotated.

In another embodiment, a system comprises a cab enclosure configured to interface with a vehicle cab, the cab enclosure comprising at least one roof adaptor, and configured to cover a portion of the vehicle cab and a rear bulkhead assembly configured around the vehicle cab, a fixed deck, configured rearward of, and cooperating with, the vehicle cab, and an extensible deck projecting from the vehicle, the extensible deck comprising a at least one support member, at least one deck section connected to the support member, and at least one pivot connecting the deck section to the vehicle. In an embodiment the upper roof adaptor is configured to cover the vehicle cab.

In an embodiment, the cab enclosure further comprises at least one pivoting roof enclosure assembly configured to interface with the roof adaptor.

In an embodiment, the fixed deck further comprises at least one load bearing deck section covering a cargo area of the vehicle.

In yet another embodiment, an apparatus comprises a cab enclosure configured to interface with a vehicle cab, a fixed deck, configured rearward of, and cooperating with, the vehicle cab, and an extensible deck projecting from, and cooperating with, the vehicle.

In an embodiment of the apparatus, the cab enclosure further comprises a roof adaptor, configured to cover a portion of the vehicle cab. In an embodiment the cab enclosure further comprises a rear bulkhead assembly configured around the vehicle cab.

In an embodiment, the cab enclosure further comprises a roof adaptor, configured to cover the rearward portion of the vehicle cab, a roof panel that interfaces with the roof adaptor and covers a frontward portion of the vehicle cab, and a rear bulkhead assembly configured around the vehicle cab wherein the cab enclosure encloses the vehicle cab without permanent modification to the vehicle.

In an embodiment, the fixed deck further comprises at least one structural deck section covering a cargo area of the vehicle wherein the fixed deck is load bearing. In an embodiment the fixed deck is attachable to the vehicle without permanent modification of the vehicle.

In an embodiment, the extensible deck further comprises at least one support member connected to the vehicle and at least one deck section connected to the support member.

In another embodiment, the apparatus further comprises at least one pivot connecting the at least one deck section to the vehicle wherein the pivot allows the deck section to be rotated.

It will be appreciated that variations of the above-disclosed and other features and functions, or alternatives thereof, may be desirably combined into many other different systems or application. Also, it should be understood that various presently unforeseen or unanticipated alternatives, modifications, variations or improvements therein may be subsequently made by those skilled in the art which are also intended to be encompassed by the following claims.

What is claimed is:

1. A system for non-permanently modifying a vehicle comprising:
    an extensible deck projecting from, and cooperating with the vehicle, the extensible deck further comprising:
        at least one deck section;
        a fixed structural support attached to the vehicle with at least one pivot;
        a movable structural support connected to the extensible deck with the at least one pivot and cooperating with the fixed structural support;
        a load control structure connected between the fixed structural support and the movable structural support wherein the extensible deck can be rotated about the at least one pivot;
        at least one transverse beam associated with the extensible deck; and
    a fixed deck associated with the vehicle wherein said extensible deck can be rotated from a position substantially in the same plane as said fixed deck to a half-deployed position substantially perpendicular to said fixed deck, and to a stowed position above and substantially parallel to said fixed deck.

2. The system of claim 1 wherein the extensible deck further comprises:
    a ladder connected to an end of the extensible deck.

3. The system of claim 2 wherein the ladder comprises a ramp.

4. The system of claim 2 further comprising:
    a rear transverse structural beam formed across the end of the extensible deck; and
    a ladder pivot attached to the rear transverse structural beam.

5. The system of claim 2 further comprising:
    a ladder fastener for securing the ladder in a stowed position to an underside of the extensible deck.

6. The system of claim 1 further comprising:
    a deployment assistance lever associated with the extensible deck.

7. The system of claim 1 further comprising:
    at least one accessory attachment element connected to the at least one transverse beam.

8. The system of claim 1 further comprising:
    at least one hole plug for plugging at least one hole in the at least one deck section.

9. The system of claim 1 wherein the extensible deck is non-permanently attachable to the vehicle.

10. The system of claim 1 further comprising:
    a deployable prop configured to support the extensible deck in the half-deployed position.

11. The system of claim 1 further comprising:
    an accessory enclosure configured on at least one of the fixed deck and the extensible deck.

12. The system of claim 11 wherein the accessory enclosure further comprises:
    at least one support bow;
    an outer cover; and
    at least one end panel.

13. The system of claim 12 wherein the accessory enclosure further comprises:
    an extension, the extension configured to allow the accessory enclosure to fit over the fixed deck and the extensible deck.

14. A system for non-permanently modifying a vehicle comprising:
    an extensible deck projecting from, and cooperating with the vehicle, the extensible deck further comprising:
        at least one deck section;
        a fixed structural support attached to the vehicle with at least one pivot;
        an movable structural support connected to the extensible deck with the at least one pivot and cooperating with the fixed structural support; and
        a load control element connected between the fixed structural support and the movable structural support wherein the extensible deck can be rotated about the at least one pivot;
    a ladder connected to an end of the extensible deck;
    a ladder fastener for securing the ladder in a stowed position to an underside of the extensible deck; and
    a fixed deck associated with the vehicle wherein said extensible deck can be rotated from a position substantially in the same plane as said fixed deck to a half-deployed position substantially perpendicular to said fixed deck, and to a stowed position above and substantially parallel to said fixed deck.

15. The system of claim 14 further comprising:
    at least one attachment element connected to the extensible deck.

* * * * *